(12) United States Patent
Brendel et al.

(10) Patent No.: US 11,620,001 B2
(45) Date of Patent: Apr. 4, 2023

(54) PICTORIAL SYMBOL PREDICTION

(71) Applicant: Snap Inc., Santa Monica, CA (US)

(72) Inventors: William Brendel, Los Angeles, CA (US); Francesco Barbieri, Barcelona (ES); Xin Chen, Torrance, CA (US); Wei Chu, Culver City, CA (US); Venkata Satya Pradeep Karuturi, Marina del Rey, CA (US); Luis Carlos Dos Santos Marujo, Culver City, CA (US); Leonardo Ribas Machado das Neves, Marina Del Rey, CA (US)

(73) Assignee: Snap Inc., Santa Monica, CA (US)

( * ) Notice: Subject to any disclaimer, the term of this patent is extended or adjusted under 35 U.S.C. 154(b) by 205 days.

(21) Appl. No.: 16/948,018

(22) Filed: Aug. 27, 2020

(65) Prior Publication Data

US 2020/0393915 A1 Dec. 17, 2020

Related U.S. Application Data

(63) Continuation of application No. 16/023,912, filed on Jun. 29, 2018, now Pat. No. 10,788,900.
(Continued)

(51) Int. Cl.
*G06F 40/166* (2020.01)
*G06F 3/023* (2006.01)
(Continued)

(52) U.S. Cl.
CPC ........ *G06F 3/0237* (2013.01); *G06F 3/04817* (2013.01); *G06F 40/166* (2020.01);
(Continued)

(58) Field of Classification Search
CPC .... G06K 9/6223; G06K 9/6271; G06N 3/084; G06N 3/08; G06N 3/0445; G06N 3/0454;
(Continued)

(56) References Cited

U.S. PATENT DOCUMENTS 5,754,939 A 5/1998 Herz et al.
6,038,295 A 3/2000 Mattes
(Continued)

FOREIGN PATENT DOCUMENTS

CA 2887596 A1 7/2015
WO WO-2012000107 A1 1/2012
(Continued)

OTHER PUBLICATIONS

"U.S. Appl. No. 16/023,912, Non Final Office Action dated Jan. 24, 2020", 10 pgs.
(Continued)

*Primary Examiner* — Jesse S Pullias
(74) *Attorney, Agent, or Firm* — Schwegman Lundberg & Woessner, P.A.

(57) ABSTRACT

Symbol prediction can be implemented using a multi-task system trained for different tasks. The tasks may include a single symbol prediction, symbol category prediction, and symbol subcategory prediction. Categories of symbols can be generated by clustering sets of training data using a clustering scheme.

20 Claims, 21 Drawing Sheets

Related U.S. Application Data

(60) Provisional application No. 62/599,640, filed on Dec. 15, 2017, provisional application No. 62/526,906, filed on Jun. 29, 2017.

(51) Int. Cl.
    *G06N 3/084*     (2023.01)
    *G06K 9/62*     (2022.01)
    *G06F 3/04817*     (2022.01)
    *H04L 51/04*     (2022.01)
    *G06F 40/274*     (2020.01)

(52) U.S. Cl.
    CPC ......... *G06F 40/274* (2020.01); *G06K 9/6223* (2013.01); *G06N 3/084* (2013.01); *H04L 51/04* (2013.01)

(58) Field of Classification Search
    CPC ........ G06N 5/003; G06N 7/005; G06N 20/20; H04L 51/04; H04L 51/08; H04L 51/02; H04L 51/10; G06V 10/82; G06V 30/153
    See application file for complete search history.

(56) References Cited

U.S. PATENT DOCUMENTS

| | | |
|---|---|---|
| 6,158,044 A | 12/2000 | Tibbetts |
| 6,167,435 A | 12/2000 | Druckenmiller et al. |
| 6,205,432 B1 | 3/2001 | Gabbard et al. |
| 6,310,694 B1 | 10/2001 | Okimoto et al. |
| 6,484,196 B1 | 11/2002 | Maurille |
| 6,487,586 B2 | 11/2002 | Ogilvie et al. |
| 6,665,531 B1 | 12/2003 | Soderbacka et al. |
| 6,701,347 B1 | 3/2004 | Ogilvie |
| 6,711,608 B1 | 3/2004 | Ogilvie |
| 6,757,713 B1 | 6/2004 | Ogilvie et al. |
| 6,980,909 B2 | 12/2005 | Root et al. |
| 7,124,164 B1 | 10/2006 | Chemtob |
| 7,149,893 B1 | 12/2006 | Leonard et al. |
| 7,173,651 B1 | 2/2007 | Knowles |
| 7,243,163 B1 | 7/2007 | Friend et al. |
| 7,278,168 B1 | 10/2007 | Chaudhury et al. |
| 7,356,564 B2 | 4/2008 | Hartselle et al. |
| 7,376,715 B2 | 5/2008 | Cunningham et al. |
| 7,411,493 B2 | 8/2008 | Smith |
| 7,478,402 B2 | 1/2009 | Christensen et al. |
| 7,496,347 B2 | 2/2009 | Puranik |
| 7,519,670 B2 | 4/2009 | Hagale et al. |
| 7,535,890 B2 | 5/2009 | Rojas |
| 7,607,096 B2 | 10/2009 | Oreizy et al. |
| 7,703,140 B2 | 4/2010 | Nath et al. |
| 7,912,896 B2 | 3/2011 | Wolovitz et al. |
| 8,131,597 B2 | 3/2012 | Hudetz |
| 8,170,957 B2 | 5/2012 | Richard |
| 8,199,747 B2 | 6/2012 | Rojas et al. |
| 8,214,443 B2 | 7/2012 | Hamburg |
| 8,238,947 B2 | 8/2012 | Lottin et al. |
| 8,244,593 B2 | 8/2012 | Klinger et al. |
| 8,312,097 B1 | 11/2012 | Siegel et al. |
| 8,332,475 B2 | 12/2012 | Rosen et al. |
| 8,570,907 B2 | 10/2013 | Garcia, Jr. et al. |
| 8,718,333 B2 | 5/2014 | Wolf et al. |
| 8,724,622 B2 | 5/2014 | Rojas |
| 8,745,132 B2 | 6/2014 | Obradovich |
| 8,874,677 B2 | 10/2014 | Rosen et al. |
| 8,909,679 B2 | 12/2014 | Root et al. |
| 8,909,714 B2 | 12/2014 | Agarwal et al. |
| 8,909,725 B1 | 12/2014 | Sehn |
| 8,914,752 B1 | 12/2014 | Spiegel |
| 8,995,433 B2 | 3/2015 | Rojas |
| 9,040,574 B2 | 5/2015 | Wang et al. |
| 9,055,416 B2 | 6/2015 | Rosen et al. |
| 9,083,770 B1 | 7/2015 | Drose et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,148,424 B1 | 9/2015 | Yang |
| 9,191,776 B2 | 11/2015 | Root et al. |
| 9,204,252 B2 | 12/2015 | Root |
| 9,225,805 B2 | 12/2015 | Kujawa et al. |
| 9,225,897 B1 | 12/2015 | Sehn et al. |
| 9,237,202 B1 | 1/2016 | Sehn |
| 9,264,463 B2 | 2/2016 | Rubinstein et al. |
| 9,276,886 B1 | 3/2016 | Samaranayake |
| 9,294,425 B1 | 3/2016 | Son |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,443,227 B2 | 9/2016 | Evans et al. |
| 9,482,882 B1 | 11/2016 | Hanover et al. |
| 9,482,883 B1 | 11/2016 | Meisenholder |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,560,006 B2 | 1/2017 | Prado et al. |
| 9,628,950 B1 | 4/2017 | Noeth et al. |
| 9,652,896 B1 | 5/2017 | Jurgensen et al. |
| 9,659,244 B2 | 5/2017 | Anderton et al. |
| 9,693,191 B2 | 6/2017 | Sehn |
| 9,705,831 B2 | 7/2017 | Spiegel |
| 9,720,955 B1 * | 8/2017 | Cao ..................... G06F 3/04886 |
| 9,742,713 B2 | 8/2017 | Spiegel et al. |
| 9,785,796 B1 | 10/2017 | Murphy et al. |
| 9,825,898 B2 | 11/2017 | Sehn |
| 9,854,219 B2 | 12/2017 | Sehn |
| 9,961,520 B2 | 5/2018 | Brooks et al. |
| 10,261,991 B2 | 4/2019 | Moskowitz et al. |
| 10,299,008 B1 | 5/2019 | Catalano et al. |
| 10,409,488 B2 | 9/2019 | Paek et al. |
| 10,788,900 B1 | 9/2020 | Brendel et al. |
| 2002/0047868 A1 | 4/2002 | Miyazawa |
| 2002/0144154 A1 | 10/2002 | Tomkow |
| 2003/0052925 A1 | 3/2003 | Daimon et al. |
| 2003/0126215 A1 | 7/2003 | Udell |
| 2003/0217106 A1 | 11/2003 | Adar et al. |
| 2004/0203959 A1 | 10/2004 | Coombes |
| 2005/0097176 A1 | 5/2005 | Schatz et al. |
| 2005/0198128 A1 | 9/2005 | Anderson |
| 2005/0223066 A1 | 10/2005 | Buchheit et al. |
| 2006/0242239 A1 | 10/2006 | Morishima et al. |
| 2006/0270419 A1 | 11/2006 | Crowley et al. |
| 2007/0038715 A1 | 2/2007 | Collins et al. |
| 2007/0064899 A1 | 3/2007 | Boss et al. |
| 2007/0073823 A1 | 3/2007 | Cohen et al. |
| 2007/0214216 A1 | 9/2007 | Carrer et al. |
| 2007/0233801 A1 | 10/2007 | Eren et al. |
| 2008/0055269 A1 | 3/2008 | Lemay et al. |
| 2008/0120409 A1 | 5/2008 | Sun et al. |
| 2008/0207176 A1 | 8/2008 | Brackbill et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0042588 A1 | 2/2009 | Lottin et al. |
| 2009/0132453 A1 | 5/2009 | Hangartner et al. |
| 2010/0082427 A1 | 4/2010 | Burgener et al. |
| 2010/0131880 A1 | 5/2010 | Lee et al. |
| 2010/0185665 A1 | 7/2010 | Horn et al. |
| 2010/0306249 A1 | 12/2010 | Hill et al. |
| 2010/0306669 A1 | 12/2010 | Della Pasqua |
| 2011/0099507 A1 | 4/2011 | Nesladek et al. |
| 2011/0145564 A1 | 6/2011 | Moshir et al. |
| 2011/0202598 A1 | 8/2011 | Evans et al. |
| 2011/0213845 A1 | 9/2011 | Logan et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0184248 A1 | 7/2012 | Speede |
| 2012/0209921 A1 | 8/2012 | Adafin et al. |
| 2012/0209924 A1 | 8/2012 | Evans et al. |
| 2012/0254325 A1 | 10/2012 | Majeti et al. |

(56) References Cited

U.S. PATENT DOCUMENTS

| | | |
|---|---|---|
| 2012/0278692 A1 | 11/2012 | Shi |
| 2012/0304080 A1 | 11/2012 | Wormald et al. |
| 2013/0071093 A1 | 3/2013 | Hanks et al. |
| 2013/0139417 A1 | 6/2013 | Mayer et al. |
| 2013/0159919 A1* | 6/2013 | Leydon .............. G06F 40/289 715/780 |
| 2013/0192103 A1 | 8/2013 | Dennis et al. |
| 2013/0192104 A1 | 8/2013 | Coughlin et al. |
| 2013/0194301 A1 | 8/2013 | Robbins et al. |
| 2013/0246950 A1 | 9/2013 | Freestone et al. |
| 2013/0283653 A1 | 10/2013 | Dennis et al. |
| 2013/0290443 A1 | 10/2013 | Collins et al. |
| 2014/0032584 A1 | 1/2014 | Baker et al. |
| 2014/0032682 A1 | 1/2014 | Prado et al. |
| 2014/0122787 A1 | 5/2014 | Shalvi et al. |
| 2014/0201527 A1 | 7/2014 | Krivorot |
| 2014/0282096 A1 | 9/2014 | Rubinstein et al. |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0199082 A1 | 7/2015 | Scholler et al. |
| 2015/0227602 A1 | 8/2015 | Ramu et al. |
| 2015/0381534 A1 | 12/2015 | Morris et al. |
| 2016/0085773 A1 | 3/2016 | Chang et al. |
| 2016/0085863 A1 | 3/2016 | Allen et al. |
| 2016/0086670 A1 | 3/2016 | Gross et al. |
| 2016/0099901 A1 | 4/2016 | Allen et al. |
| 2016/0180887 A1 | 6/2016 | Sehn |
| 2016/0277419 A1 | 9/2016 | Allen et al. |
| 2016/0321708 A1 | 11/2016 | Sehn |
| 2016/0359957 A1 | 12/2016 | Laliberte |
| 2016/0359987 A1 | 12/2016 | Laliberte |
| 2017/0052946 A1 | 2/2017 | Gu et al. |
| 2017/0161382 A1 | 6/2017 | Ouimet et al. |
| 2017/0180276 A1 | 6/2017 | Gershony et al. |
| 2017/0185581 A1* | 6/2017 | Bojja .................. G06F 16/353 |
| 2017/0220549 A1 | 8/2017 | Ishii |
| 2017/0228600 A1 | 8/2017 | Syed et al. |
| 2017/0263029 A1 | 9/2017 | Yan et al. |
| 2017/0287006 A1 | 10/2017 | Azmoodeh et al. |
| 2017/0295250 A1 | 10/2017 | Samaranayake et al. |
| 2017/0308587 A1* | 10/2017 | Nagel ................. G06F 3/04895 |
| 2017/0344224 A1 | 11/2017 | Kay et al. |
| 2017/0364568 A1 | 12/2017 | Reynolds et al. |
| 2017/0374003 A1 | 12/2017 | Allen et al. |
| 2017/0374508 A1 | 12/2017 | Davis et al. |
| 2018/0033173 A1 | 2/2018 | Choi et al. |
| 2018/0107945 A1* | 4/2018 | Gao ...................... G06N 20/00 |
| 2018/0114112 A1 | 4/2018 | Willson et al. |
| 2018/0137529 A1 | 5/2018 | Griffin |
| 2018/0173692 A1 | 6/2018 | Greenberg et al. |
| 2018/0262864 A1 | 9/2018 | Reynolds et al. |
| 2018/0348890 A1 | 12/2018 | Yang et al. |
| 2018/0348962 A1 | 12/2018 | Cranfill et al. |
| 2019/0079922 A1 | 3/2019 | Moskowitz et al. |
| 2019/0117142 A1 | 4/2019 | Moskowitz |
| 2019/0379618 A1 | 12/2019 | Rabbat et al. |

FOREIGN PATENT DOCUMENTS

| | | |
|---|---|---|
| WO | WO-2013008251 A2 | 1/2013 |
| WO | WO-2014194262 A2 | 12/2014 |
| WO | WO-2015192026 A1 | 12/2015 |
| WO | WO-2016054562 A1 | 4/2016 |
| WO | WO-2016065131 A1 | 4/2016 |
| WO | WO-2016/112299 A1 | 7/2016 |
| WO | WO-2016179166 A1 | 11/2016 |
| WO | WO-2016179235 A1 | 11/2016 |
| WO | WO-2017176739 A1 | 10/2017 |
| WO | WO-2017176992 A1 | 10/2017 |
| WO | WO-2018005644 A1 | 1/2018 |

OTHER PUBLICATIONS

"U.S. Appl. No. 16/023,912, Notice of Allowance dated May 28, 2020", 9 pgs.

"U.S. Appl. No. 16/023,912, Response filed Apr. 23, 2020 to Non Final Office Action dated Jan. 24, 2020", 8 pgs.

Castelluccia, Claude, et al., "EphPub: Toward robust Ephemeral Publishing", 19th IEEE International Conference on Network Protocols (ICNP), (Oct. 17, 2011), 18 pgs.

Fajman, "An Extensible Message Format for Message Disposition Notifications", Request for Comments: 2298, National Institutes of Health, (Mar. 1998), 28 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.

Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

Shein, Esther, "Ephemeral Data", Communications of the ACM, vol. 56, No. 9, (Sep. 2013), 3 pgs.

Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.

U.S. Appl. No. 16/023,912 U.S. Pat. No. 10,788,900, filed Jun. 29, 2018, Pictorial Symbol Prediction.

U.S. Appl. No. 16/438,274, filed Jun. 11, 2019, Presenting Visual Media.

"U.S. Appl. No. 16/438,274, Advisory Action dated Jan. 6, 2021", 3 pgs.

"U.S. Appl. No. 16/438,274, Appeal Brief filed Jun. 21, 2022", 25 pgs.

"U.S. Appl. No. 16/438,274, Examiner Interview Summary dated Jul. 27, 2021", 2 pgs.

"U.S. Appl. No. 16/438,274, Final Office Action dated Sep. 22, 2021", 15 pgs.

"U.S. Appl. No. 16/438,274, Final Office Action dated Oct. 27, 2020", 14 pgs.

"U.S. Appl. No. 16/438,274, Non Final Office Action dated Apr. 8, 2021", 12 pgs.

"U.S. Appl. No. 16/438,274, Non Final Office Action dated May 27, 2020", 11 pgs.

"U.S. Appl. No. 16/438,274, Response filed Jan. 20, 2021 to Advisory Action dated Jan. 6, 2021", 12 pgs.

"U.S. Appl. No. 16/438,274, Response filed Jul. 8, 2021 to Non Final Office Action dated Apr. 8, 2021", 10 pgs.

"U.S. Appl. No. 16/438,274, Response filed Oct. 12, 2020 to Non Final Office Action dated May 27, 2020", 11 pgs.

"U.S. Appl. No. 16/438,274, Response filed Dec. 17, 2020 to Final Office Action dated Oct. 27, 2020", 10 pgs.

"U.S. Appl. No. 16/438,274, Non Final Office Action dated Nov. 9, 2022", 14 pgs.

Birchall, Guy, "Royal Messenger How to send confetti on your iPhone for the Royal Wedding—all the special effects from balloons and fireworks to lasers", (May 19, 2018), 17 pgs.

* cited by examiner

1700

1702

1704

1706

1708

1710

1712

1714

1716

1718

1720

1722

1724

1726

1728

1730

1732

1734

1736

1738

1740

PICTORIAL SYMBOL PREDICTION

CLAIM OF PRIORITY

This application is a continuation of U.S. patent application Ser. No. 16/023,912, filed on Jun. 29, 2018, which claims the benefit of priority to U.S. Provisional Application Ser. No. 62/526,906, filed on Jun. 29, 2017; and U.S. Provisional Application Ser. No. 62/599,640, filed on Dec. 15, 2017, the contents of each of which are incorporated herein by reference in their entireties.

TECHNICAL FIELD

Embodiments of the present disclosure relate generally to machine learning and, more particularly, but not by way of limitation, to machine learning-based symbol suggestions.

BACKGROUND

Emojis are ideograms (e.g., pictures, symbols) that can be used to concisely describe an idea or complement nearby text with an emotion, concept, or a hard to describe subtle aspect. How emojis are used and understood can depend on the groups of people using them. Due to their ability to describe difficult and subtle aspects of an idea, emoji suggestions generated by machine learning schemes can often be non-relevant or otherwise inaccurate.

BRIEF DESCRIPTION OF THE DRAWINGS

To easily identify the discussion of any particular element or act, the most significant digit or digits in a reference number refer to the FIG. ("FIG.") number in which that element or act is first introduced.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed above, symbol suggestion is difficult due to subtle linkages between given symbols and how users apply the symbols. To this end, a pictorial symbol system is configured to receive messages (e.g., text/caption data, video data with audio voice data) and generate relevant suggestions for display to the user. In some example embodiments, the pictorial symbol system includes a task sub-system that is trained to generate symbol predictions at different granularities or "tasks". For example, the task sub-system can be trained on a first single symbol prediction task, a second symbol category prediction task, and a third sub-category symbol prediction task.

Figure 17:
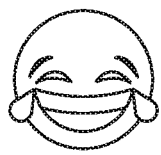
FIG. 17 shows an example set of pictorial symbols, according to some example embodiments.
Figure 17:
Figure 17:
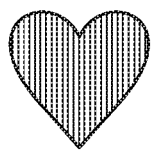
Figure 17:
Figure 17:
Figure 17:
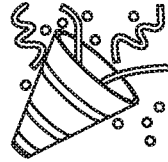
Figure 17:
Figure 17:
Figure 17:
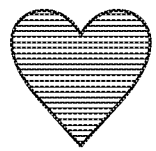
Figure 17:
Figure 17:
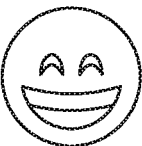
Figure 17:
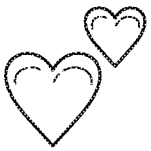
Figure 17:
Figure 17:
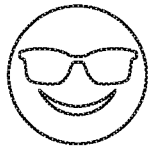
Figure 17:
Figure 17:
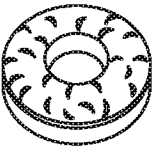
Figure 17:
Figure 17:
Figure 17:
Figure 17:
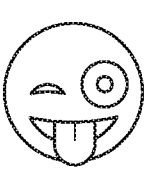

In some example embodiments, the symbols are grouped into pre-set categories and sub-categories, such as Unicode emoji categories and sub-categories. (Unicode is a computing standard to reference encoding and handling of text items and symbols.) FIG. 17 shows examples of emojis 1702-1740. The task sub-system is able to capture linkages between a given caption and individual single emojis, and also between the given caption and the categories and subcategories. This is beneficial because if the first task prediction is not sufficiently accurate, the task sub-system can fall back on broader categories and sub-categories, which may yield higher accuracy related to a given user's caption.

In some example embodiments, the task sub-system is trained on semantically generated categories that capture linkages missed by the pre-set categories and sub-categories. The semantically generated categories can be generated using a clustering scheme (e.g., k-means). In some embodiments, the task sub-system falls back on semantically generated category predictions if the symbol category predictions are not accurate or do not meet a pre-specified threshold.

In some example embodiments, the pictorial symbol system includes a multimodal sub-system that is trained to generate symbol predictions based on keywords in audio data recorded by a user's client device. The multimodal sub-system can implement a machine learning scheme, such as random forest, that is trained on publicly available network posts that do not have music and are in the primary language of the client device. In some example embodiments, the primary language is identified by determining the keyboard language setting of the user's client device. In some example embodiments, the primary language is determined by applying a language recognition scheme to audio data recorded by the user of the client device.

Figure 1:
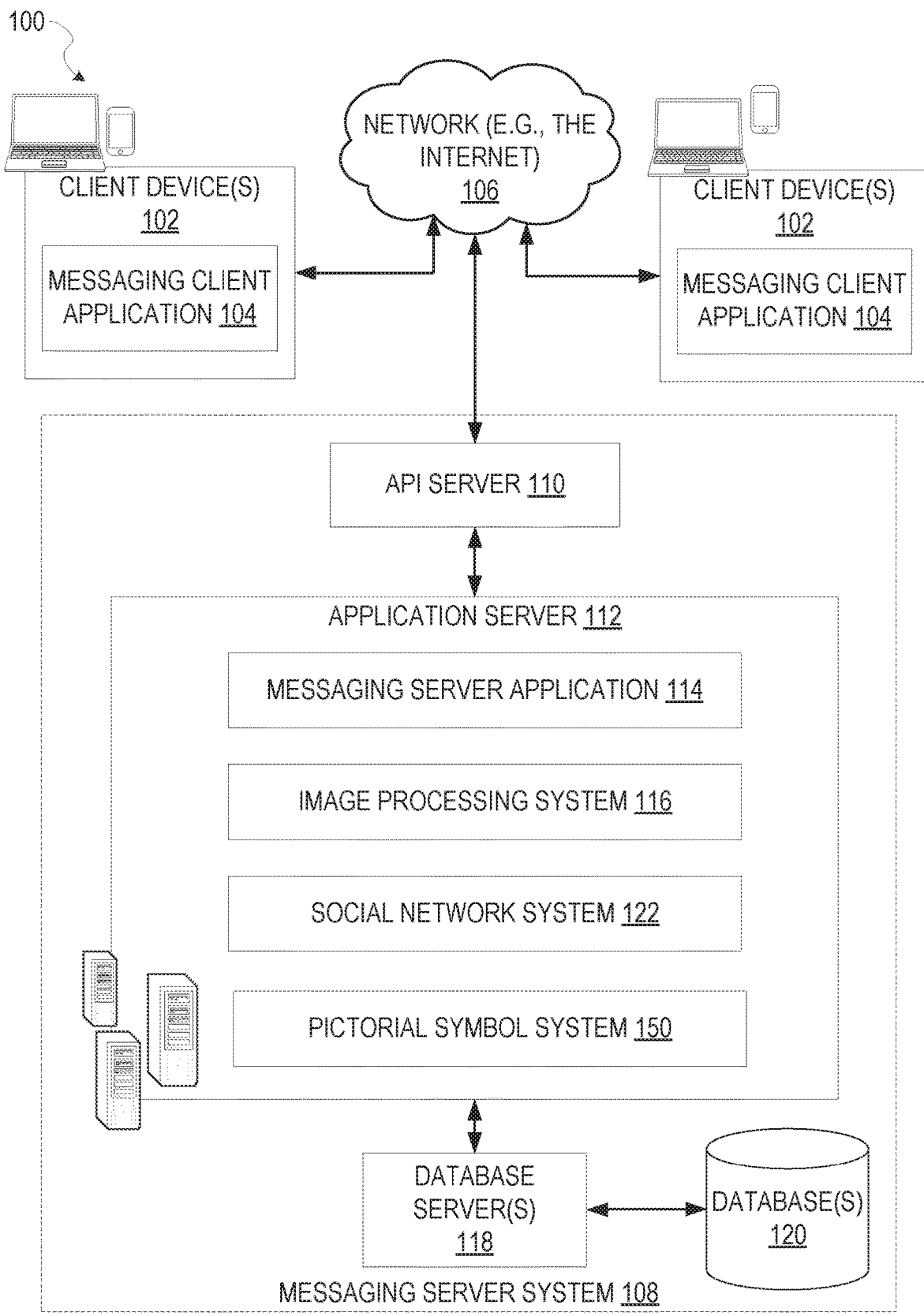
FIG. 1 is a block diagram showing an example messaging system for exchanging data (e.g., messages and associated content) over a network.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet). In various embodiments, virtual machine learning can be used by messaging client application 104 and/or image processing system 116 to analyze images sent within the messaging system 100, and to use this analysis to provide features within the messaging system 100.

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, include functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, image search, social network information, and live event information, as examples, some of which rely on information generated by analyzing images sent through the messaging system 100. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112. In some embodiments, databases 120 may also store results of image processing, or details of various trained and untrained support vector machines that may be used by messaging server system 108.

The API server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the addition and deletion of friends to and from a social graph; the location of friends within the social graph; and application events (e.g., relating to the messaging client application 104).

The application server 112 hosts a number of applications and subsystems, including the messaging server application 114, an image processing system 116, a social network system 122, and a pictorial symbol system 150, according to some example embodiments. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following", and also the identification of other entities and interests of a particular user.

Further, although FIG. 1 shows the pictorial symbol system 150 integrated into the application server 112, in some example embodiments, the pictorial symbol system 150 is integrated entirely within messaging client application 104. Further, in some example embodiments, some of the engines of the pictorial symbol system 150 are executed on a server (e.g., application server 112) and some of the engines of the pictorial symbol system 150 are executed from the client device 102 (e.g., as part of the messaging client application 104). For example, an instance of the machine learning system (discussed below) may be trained to create a classifier model. The classifier model data can then be transferred to one or more client devices 102. On the one or more client devices 102, another instance of the machine learning system may apply the received classifier model to classify voice data in a snap and recommend an emoji on the client device 102 without connecting to the application server 112 to generate the suggestion.

The application server 112 is communicatively coupled to a database server 118, which facilitates access to a database 120 in which is stored data associated with messages processed by the messaging server application 114.

Figure 2:
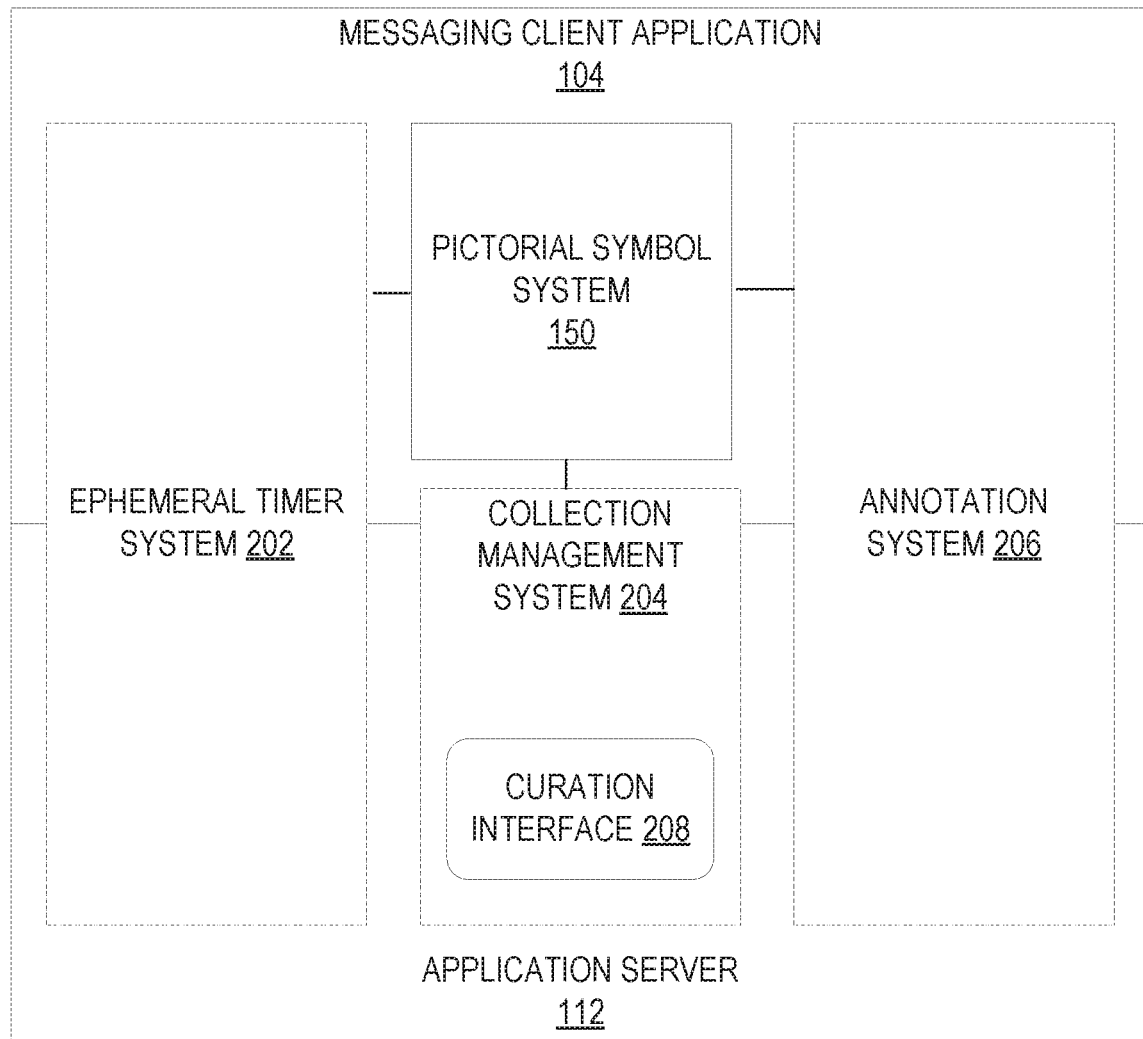
FIG. 2 is a block diagram illustrating further details regarding the messaging system of FIG. 1, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and a pictorial symbol system or pictorial symbol system 150. The pictorial symbol system 150 is discussed in further detail below.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a story), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story". Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a geofilter or filter) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

Figure 3:
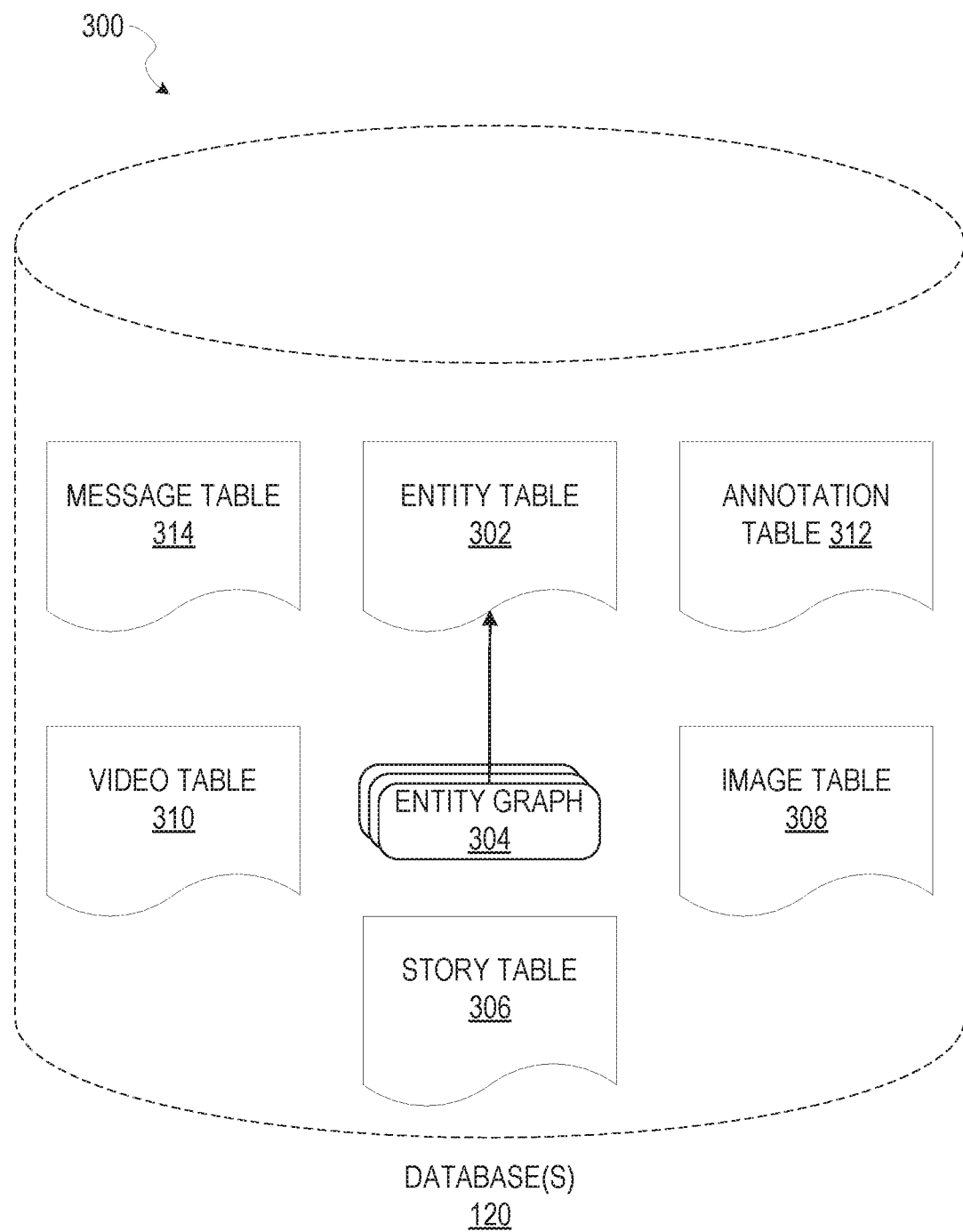
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments.

While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, etc. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interested-based, or activity-based, merely for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story", which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104, based on his or her location. The end result is a "live story" told from a community perspective.

A further type of content collection is known as a "location story", which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
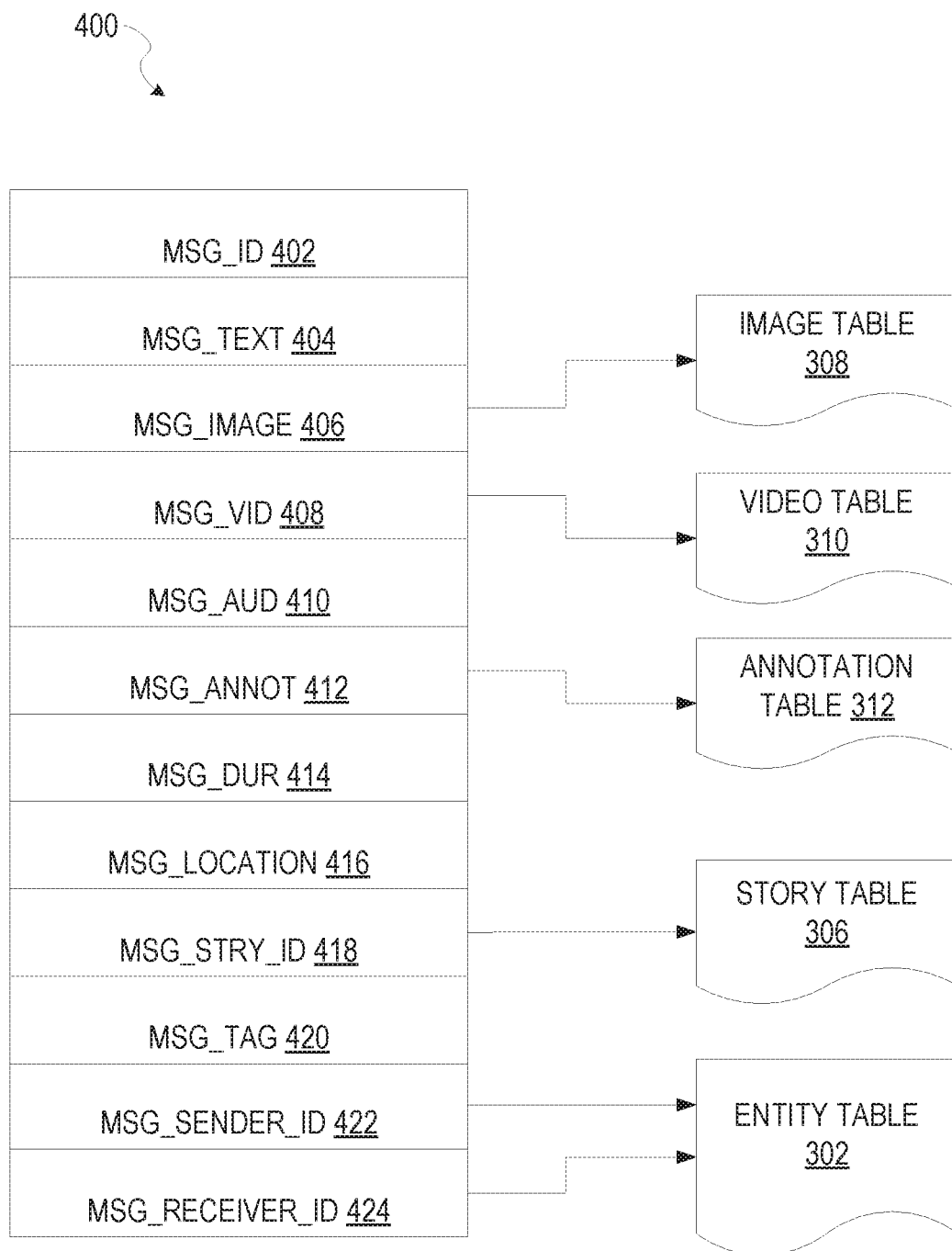
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102, and that is included in the message 400.

A message image payload 406: image data, captured by a camera component of a client device 102 or retrieved from memory of a client device 102, and that is included in the message 400.

A message video payload 408: video data, captured by a camera component or retrieved from a memory component of the client device 102, and that is included in the message 400.

A message audio payload 410: audio data, captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, each of these parameter values being associated with respective content items included in the content (e.g., a specific image in the message image payload 406, or a specific video in the message video payload 408).

- A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.
- A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- A message sender identifier 422: an identifier (e.g., a messaging system identifier, email address, or device identifier) indicative of a user of the client device 102 on which the message 400 was generated and from which the message 400 was sent.
- A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
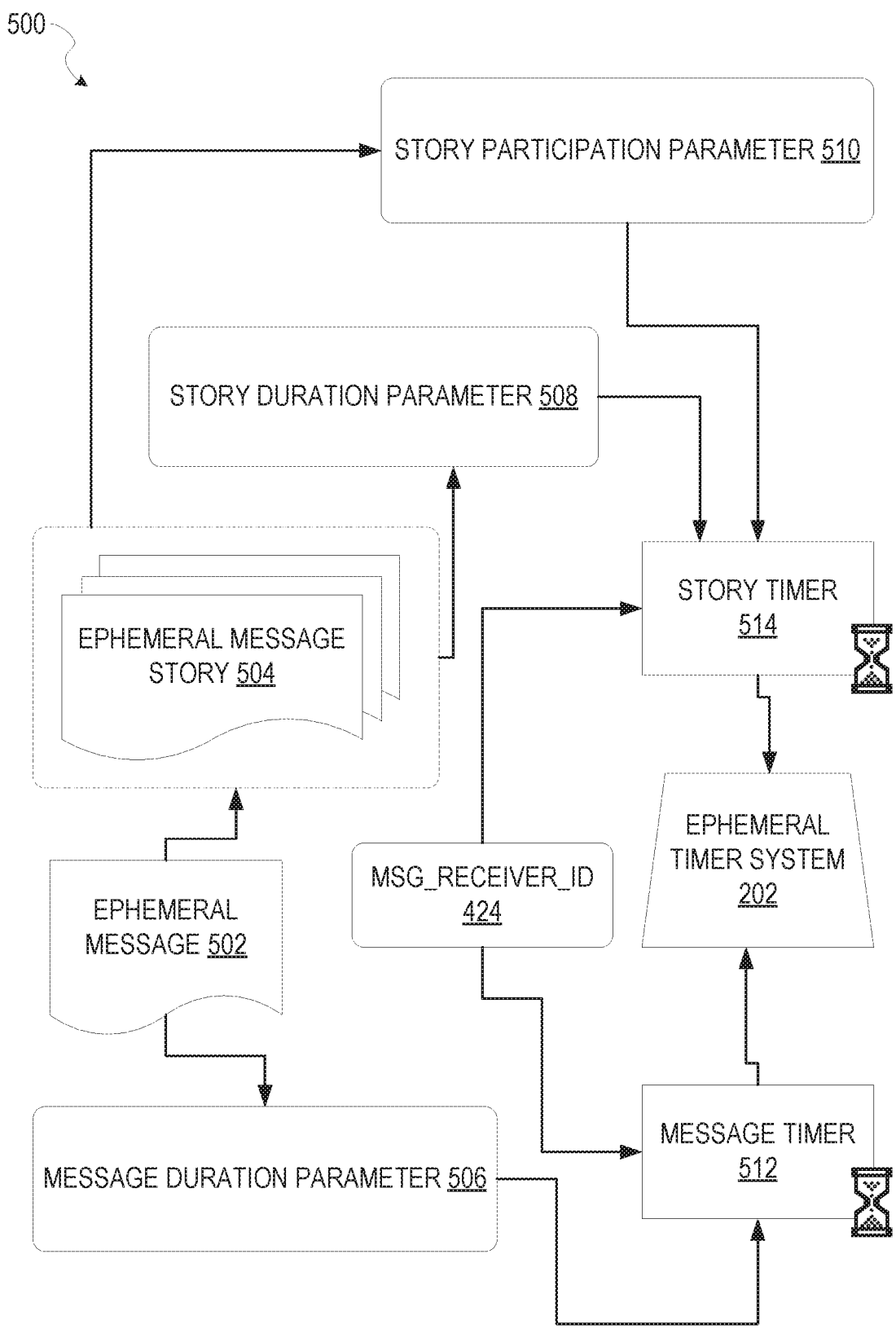
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral), according to some example embodiments.

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is an application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
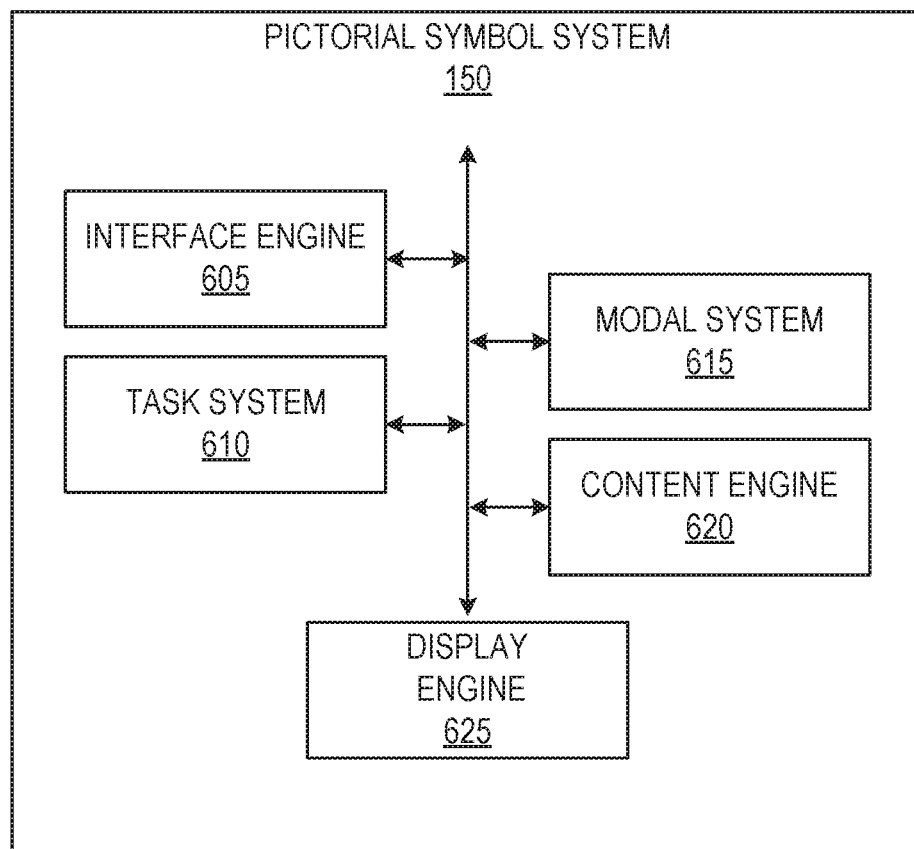
FIG. 6 illustrates example functional components of a pictorial symbol system, according to some example embodiments.

FIG. 6 illustrates example functional components of a pictorial symbol system 150, according to some example embodiments. As illustrated, the pictorial symbol system 150 comprises an interface engine 605, a task system 610, a multimodal system 615, a content engine 620, and a display engine 625. The interface engine 605 is configured to interface with the application 104. For example, the interface engine 605 can receive locations of one or more images generated by the messaging client application 104 using an image sensor of the client device 102. Further, according to some example embodiments, the interface engine 605 is configured to receive one or more text characters (e.g., a caption, a sentence, one or more punctuation marks) for input into the pictorial symbol system 150.

The task system 610 is a subsystem that is configured to generate one or more pictorial symbol suggestions using a multi-task machine learning scheme, such as a multi-task neural network, as discussed in further detail below with reference to FIGS. 7-10. The multimodal system 615 is a subsystem that is configured to generate one or more pictorial symbol suggestions using a keyword speech recognition scheme, as discussed in further detail below with reference to FIGS. 11-13. The content engine 620 is configured to select one or more display elements that have been pre-associated with categories or individual pictorial symbol predictions generated by the task system 610 or the multimodal system 615, as discussed in further detail below with reference to FIG. 14. The display engine 625 is configured to display the selected content on a display device of the client device 102. For example, the display engine 625 may display the selected content in a suggestion window as a user is inputting text into the client device 102.

Figure 7:
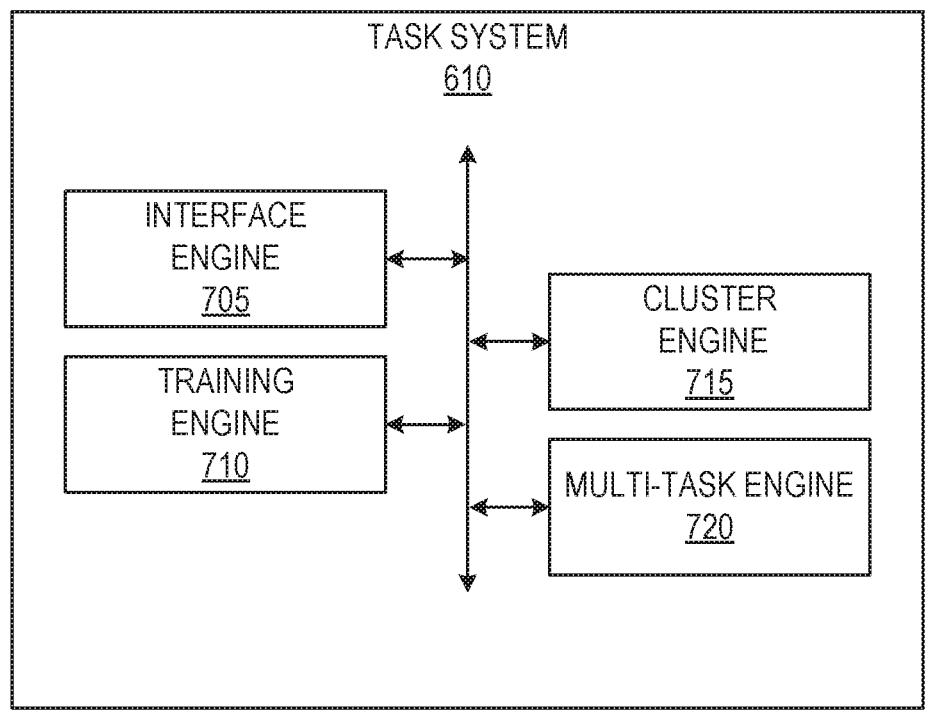
FIG. 7 illustrates example functional engines of the task system, according to some example embodiments.

FIG. 7 illustrates example functional engines of the task system 610, according to some example embodiments. As illustrated, the task system 610 comprises an interface engine 705, a training engine 710, a cluster engine 715, and a multi-task engine 720. The interface engine 705 manages identifying text data for input into the multi-task engine 720 and selecting content for display. The training engine 710 is configured to train the machine learning schemes in the multi-task engine 720 on training data, such as network posts comprising one or more symbols (e.g., emojis) and text (e.g., captions). In some example embodiments, the training engine 710 is not integrated into a task system 610 installed on the client device 102. Rather, in those example embodiments, the training engine 710 executes on the application server 112 to generate machine learning models, such as neural network models, which can then be transmitted to client devices 102 for execution and prediction of symbols.

The cluster engine 715 is configured to generate clusters of pictorial symbol categories. In some example embodiments, the cluster engine 715 uses clustering schemes, such as K-means clustering, to semantically generate classes of symbols that are semantically similar to one another.

The multi-task engine 720 is configured to implement a machine learning scheme that generates classifications or likelihoods that the subject matter of text input into the machine learning scheme corresponds to pictorial symbols or categories of pictorial symbols (e.g., emojis and categories of emojis).

Figure 8A:
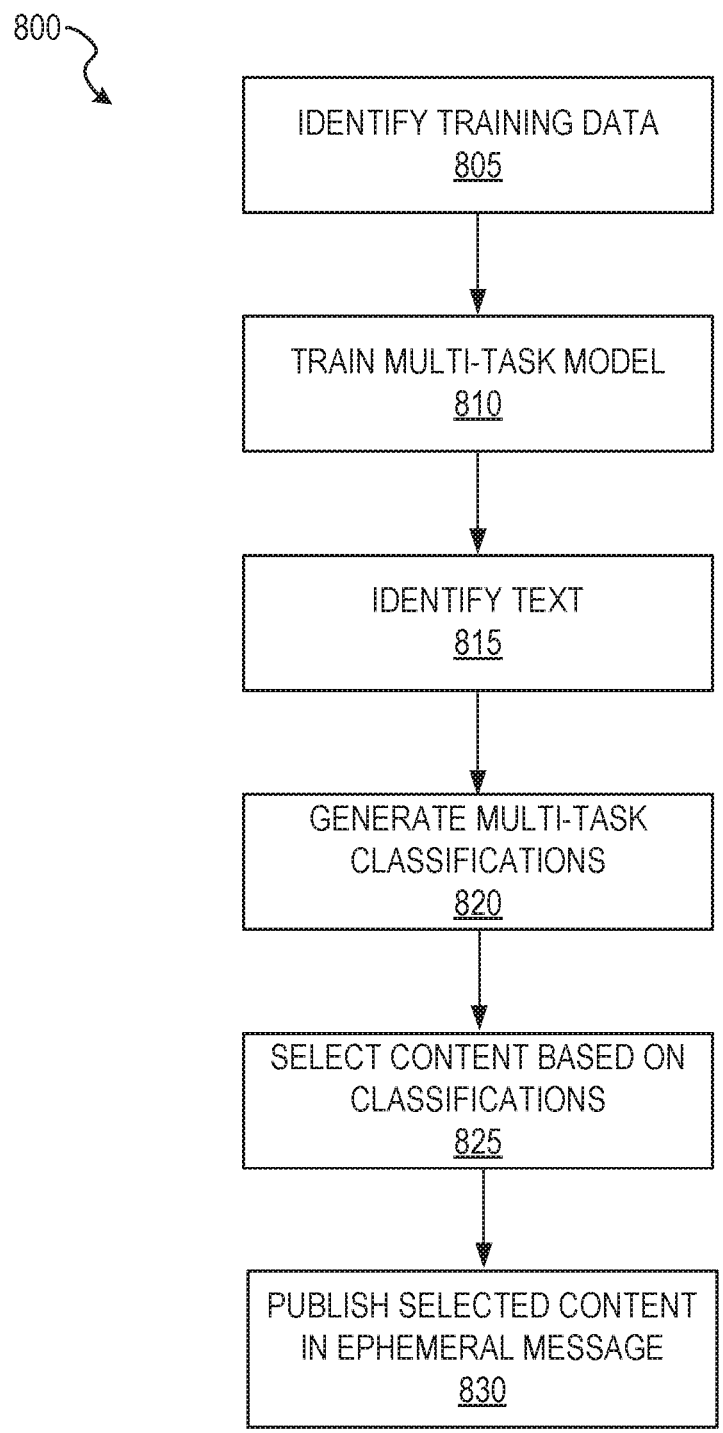
FIG. 8A shows a flow diagram of a method for pictorial symbol classification and content selection, according to some example embodiments.

FIG. 8A shows a flow diagram of a method 800 for pictorial symbol classification and content selection, according to some example embodiments. At operation 805, the training engine 710 identifies training data. For example, at operation 805, the training engine 710 may identify a collection of network posts (e.g., ephemeral message 502) that have a text caption and at least one pictorial symbol. In some example embodiments, each of the network posts that have a caption and at least one pictorial symbol are used to generate skip-gram word embeddings, which are used to train the multi-task neural network. In some example embodiments, of the identified network posts, only posts that contain the top N used emojis are stored as training data. For example, of the identified publicly available network posts, only posts that include one of the top 20 user-selected emojis are identified and stored as training data at operation 805.

At operation 810, the training engine 710 trains the multi-task model of a machine learning scheme (e.g., a neural network) for implementation in the multi-task engine 720. In some example embodiments, the multi-task model is trained end-to-end using neural network techniques (e.g., back propagation, etc.) to maximize the likelihood of text input into the model yielding a correct pictorial symbol output of a given text/symbol pair in the training data. Further details of training the multi-task engine 720 are discussed in detail with reference to FIG. 10 below.

At operation 815, the multi-task engine 720 identifies text as input data. For example, the text can be characters input into the client device 102 using a touch-screen keyboard. At operation 820, the multi-task engine 720 analyzes the text as it is being entered and uses the texts to generate multi-task classifications using a machine learning scheme trained on the model generated by the training engine 710.

In some example embodiments, the multi-task classifications generated by the multi-task engine 720 at operation 820 include a first likelihood that the subject matter of the text is correlated with individual pictorial symbols, a second likelihood that the subject matter of the text is correlated with categories of pictorial symbols, and a third likelihood that the subject matter of the text is correlated with subcategories of pictorial symbols. Each of the classifications are numerical likelihoods that a given pictorial symbol, category, or subcategory is of a subject matter that is the same or similar to the subject matter of the text being input by the user.

At operation 825, the interface engine 705 selects one or more display elements or items of content based on the classifications generated at operation 820. For example, if the multi-task engine 720 generates a classification that the text is strongly correlated with an item of food, then at operation 825, the interface engine 705 selects a food emoji as a suggestion for display.

In some example embodiments, the suggested emoji, emoji categories, and emoji sub-categories are used to identify non-emoji content that can be suggested to a user for inclusion in an ephemeral post. For instance, although the multi-task engine 720 outputs a heart emoji result, the heart emoji has been pre-associated with other love-related content (e.g., a cartoon cupid) that can be suggested for overlay in an ephemeral message. Likewise, if a food emoji category is output of the multi-task engine 720, then a plurality of non-emoji food content items (e.g., cartoon taco, cartoon captions, video effects) can be suggested to the user or otherwise displayed on the client device 102.

At operation 830, the display engine 625 displays the selected content on a display device of the client device 102. The user may select the displayed content for inclusion in an ephemeral message, which is then published to a network site for network access by other users through the application server 112.

Figure 8B:
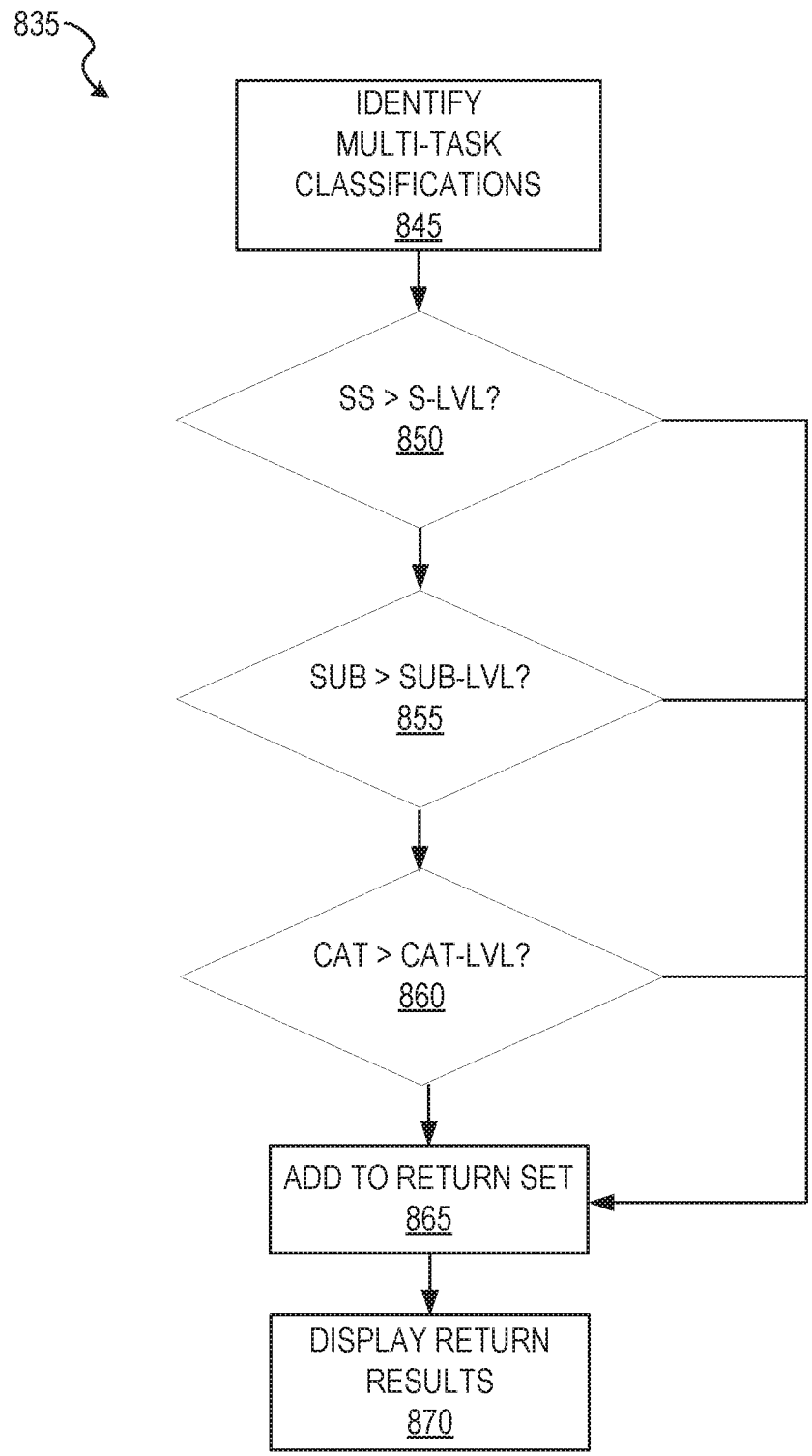
FIG. 8B shows an example flow diagram of a method for generating classifications, according to some example embodiments.

FIG. 8B shows an example flow diagram of a method 835 for generating classifications, according to some example embodiments. Method 835 can be configured as a subroutine of operation 825 in which one or more classifications are selected from the group of classifications generated by the multi-task engine 720. At operation 845, the interface engine 705 identifies the classification data output by the multi-task engine 720. The classification data can include single symbol classification data (denoted as "SS" in FIG. 8B), sub-category classification data (denoted as "SUB" in FIG. 8B), and category classification data (denoted as "CAT" in FIG. 8B). Each set of the classification data is compared against a threshold to determine whether the classification data is higher than a prespecified threshold. If a given set of classification data is higher than its threshold, the classification is considered sufficiently accurate and the corresponding pictorial symbols can be included in the return set for suggestion to a user.

In particular, at operation 850, the interface engine 705 determines whether the single symbol classification data satisfies a single symbol threshold ("S-LVL"). If the single symbol classification data satisfies the threshold, content or pictorial symbols corresponding to the single symbol classification data are added to the return set at operation 865.

Likewise at operation 855, the interface engine 705 determines whether the subcategory classification data satisfies a subcategory classification data ("SUB-LVL"). If the subcategory classification data satisfies the threshold, content or pictorial symbols corresponding to the subcategory classification data are added to the return set at operation 865.

Further, at operation 860, the interface engine 705 determines whether the category classification data satisfies a category classification data ("CAT-LVL"). If the category classification data satisfies the threshold, content or pictorial symbols corresponding to the category classification data are added to the return set at operation 865.

At operation 870, the interface engine 705 displays the content on a display device of the client device 102 as suggestions of content to include in an ephemeral message.

In some example embodiments, the different thresholds of the different classification sets are different values. For example, the confidence or threshold for the single set may be higher than the subcategory category thresholds to ensure that if a single symbol is suggested, it is more likely to be an accurate related symbol.

In some example embodiments, not all classification types and corresponding contents can be added to the return set. For example, the single pictorial symbol classification data can first be analyzed to determine whether it satisfies the threshold. If the single pictorial symbol classification data satisfies the threshold, then content associated with the single symbol is suggested to the user without analyzing the subcategory and category level classifications. On the other hand, if the single pictorial symbol classification does not satisfy its threshold, then as a fallback the subcategory classification data is analyzed to determine whether subcategory classification data meets the subcategory threshold. If the subcategory classification meets its threshold, the content associated with the subcategory is displayed as suggestions to the user. On the other hand, if the subcategory classification does not meet the subcategory threshold, then the even broader category classification data is analyzed to determine whether it meets the category level threshold. If the category classification data meets the category level threshold, the content associated with the category is displayed as suggestions to the user. In this way, if a more narrow or specific item of content (e.g., an individual emoji) has a higher score, competition or resources are conserved by displaying only the specific item of content without showing multiple items of content of the broader subcategory and broadest category set.

Figure 8C:
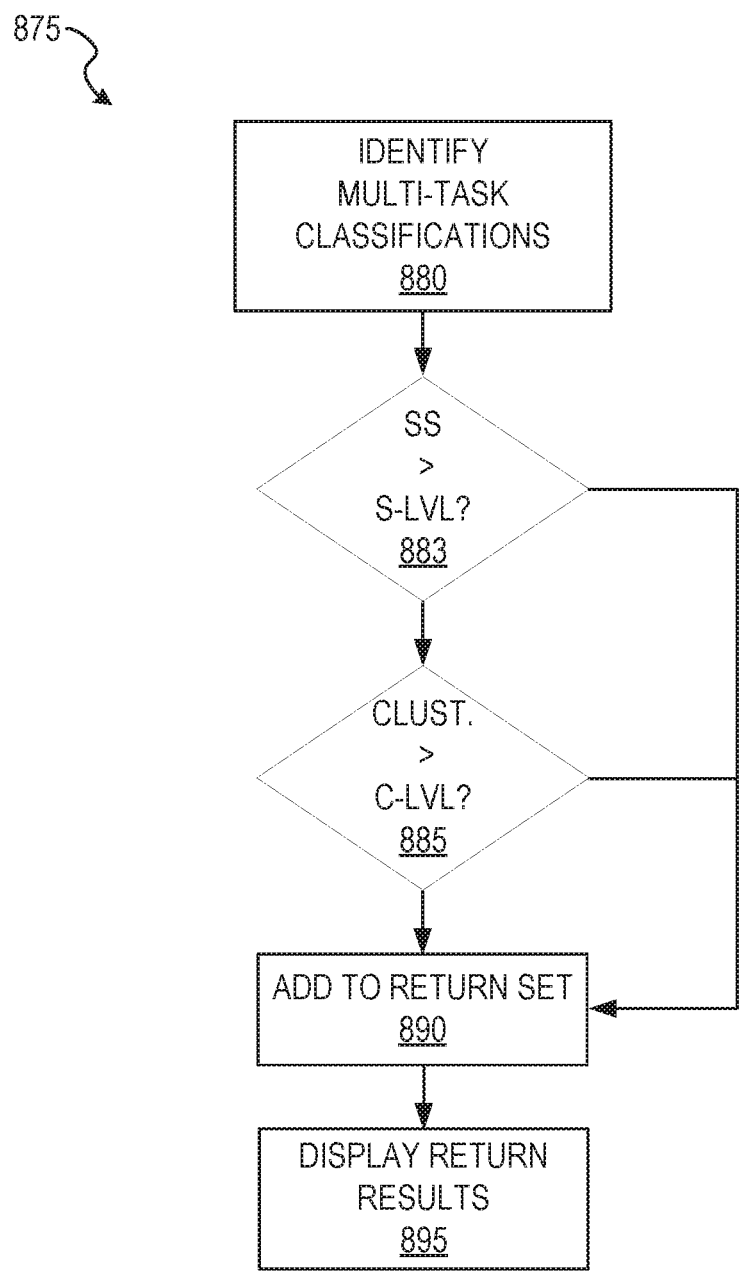
FIG. 8C shows an example flow diagram of a method for generating classifications, according to some example embodiments.

FIG. 8C shows an example flow diagram of a method 875 for generating classifications, according to some example embodiments. Method 875 can be configured as a subroutine of operation 825 in which one or more classifications are selected from the group of classifications generated by the multi-task engine 720. As illustrated in the example of FIG. 8C, the subcategory and category level likelihoods and associated content are replaced by a new category of pictorial symbols generated using clustering techniques as discussed below, with reference to FIG. 9.

At operation 880, the interface engine 705 identifies the classification data output by the multi-task engine 720. The classification data can include single symbol classification data (denoted as "SS" in FIG. 8C) and cluster classification data (denoted as "CLUST." in FIG. 8C). Each set of the classification data is compared against a threshold to determine whether the classification data is higher than a prespecified threshold. If a given set of classification data is higher than its threshold, the classification is considered sufficiently accurate to the user's caption and the corresponding pictorial symbols can be included in the return set for suggestion to a user.

In particular, at operation 883, the interface engine 705 determines whether the single symbol classification data satisfies a single symbol threshold ("S-LVL"). If the single symbol classification data satisfies the threshold, content or pictorial symbols corresponding to the single symbol classification data are added to the return set at operation 890.

Likewise at operation 885, the interface engine 705 determines whether the cluster classification data satisfies a cluster classification threshold ("C-LVL"). If the cluster classification data satisfies the threshold, content or pictorial symbols corresponding to the cluster classification data are added to the return set at operation 890.

In some example embodiments, the different thresholds of the different classification sets are different values. For example, the confidence or threshold for the single set may be higher than the cluster category threshold to ensure that if a single symbol is suggested, it is more likely to be an accurate related symbol.

In some example embodiments, not all classification types and corresponding contents are added to the return set. For example, the single pictorial symbol classification data can first be analyzed to determine whether it satisfies the threshold. If the single pictorial symbol classification data satisfies the threshold, then content associated with the single symbol is suggested to the user without analyzing the cluster-based classifications. On the other hand, if the single pictorial symbol classification does not satisfy its threshold, then as a fallback the cluster classification data is analyzed to determine whether cluster classification data meets the cluster category threshold. If the cluster category classification data meets its threshold, the content associated with the given cluster category is displayed as suggestions to the user. In this way, if a narrower or more specific item of content (e.g., an individual emoji) has a higher score, competition or resources are conserved by displaying only the specific item of content without showing multiple items of content of the broader cluster category.

Figure 9:
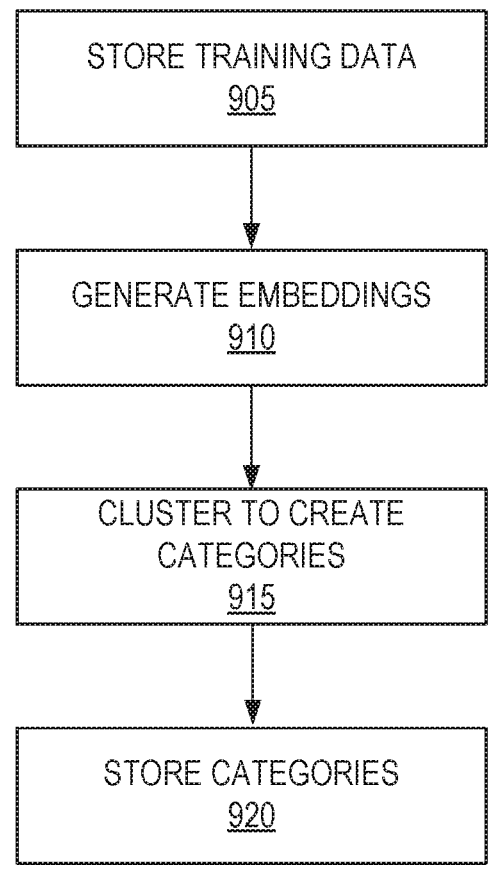
FIG. 9 shows a flow diagram of a method of semantically generating pictorial symbols using a clustering scheme, according to some example embodiments.

FIG. 9 shows a flow diagram of a method 900 of semantically generating pictorial symbols using a clustering scheme, according to some example embodiments. The cluster-based categories can be used as one type of category for pictorial symbol suggestions, as discussed in FIG. 8C above. In some approaches, categories and sub-categories of emojis may partition similar emojis into different categories even though they are related and commonly used together or as replacements in user posts. For example, referring to FIG. 17, emoji 1714 ("tired face") and emoji 1740 ("winking face with tongue") are both in the Unicode sub-category of neutral faces even though they clearly indicate different emotions. Another example: emoji 1704 ("smiling face with heart-eyes") and emoji 1706 ("red heart") are semantically similar, but they appear in different Unicode categories. A more subtle example: emoji 1706 ("red heart") and emoji 1718 ("blue heart") are in the same Unicode category and in the same Unicode subcategory, but may be used by users in drastically different ways. For instance, a user that is sending a text message to an acquaintance may prefer the emoji 1718 ("blue heart"), and accidently sending emoji 1706 ("red heart") may result in a miscommunication.

To this end, a cluster engine 715 is configured to generate semantically similar emojis into clusters, which can be treated as different categories (e.g., a semantically generated love category, a semantically generated happy category, etc.) for training and symbol suggestions. With reference to FIG. 9, at operation 905, the cluster engine 715 identifies training data. In some example embodiments, the training data includes publicly available posts (e.g., social media posts) that contain text and at least one pictorial symbol or emoji. In some example embodiments, of the available posts, only posts that contain the top N used pictorial symbols are saved as training data. For example, while there may be hundreds of emojis in thousands of posts, only posts containing the top 300 most frequently used emojis are stored as training data. Generally, the semantically based categories enable a larger set of most frequently used emojis (e.g., 300) to be included in the training set of data instead of smaller, more frequently used emoji training sets (e.g., only including posts that contain the top 20 most frequently used emojis as training data).

At operation 910, the cluster engine 715 generates embeddings for each of the pictorial symbols based on their accompanying text or caption. In some example embodiments, the cluster engine 715 generates the embedding's using in a skip-gram based model. At operation 915, the cluster engine 715 clusters the generated embeddings using a clustering scheme, such as K-means clustering. At operation 920, the cluster engine 715 stores the semantically generated cluster categories for use in a multi-task neural network engine, such as multi-task engine 720.

Figure 10:
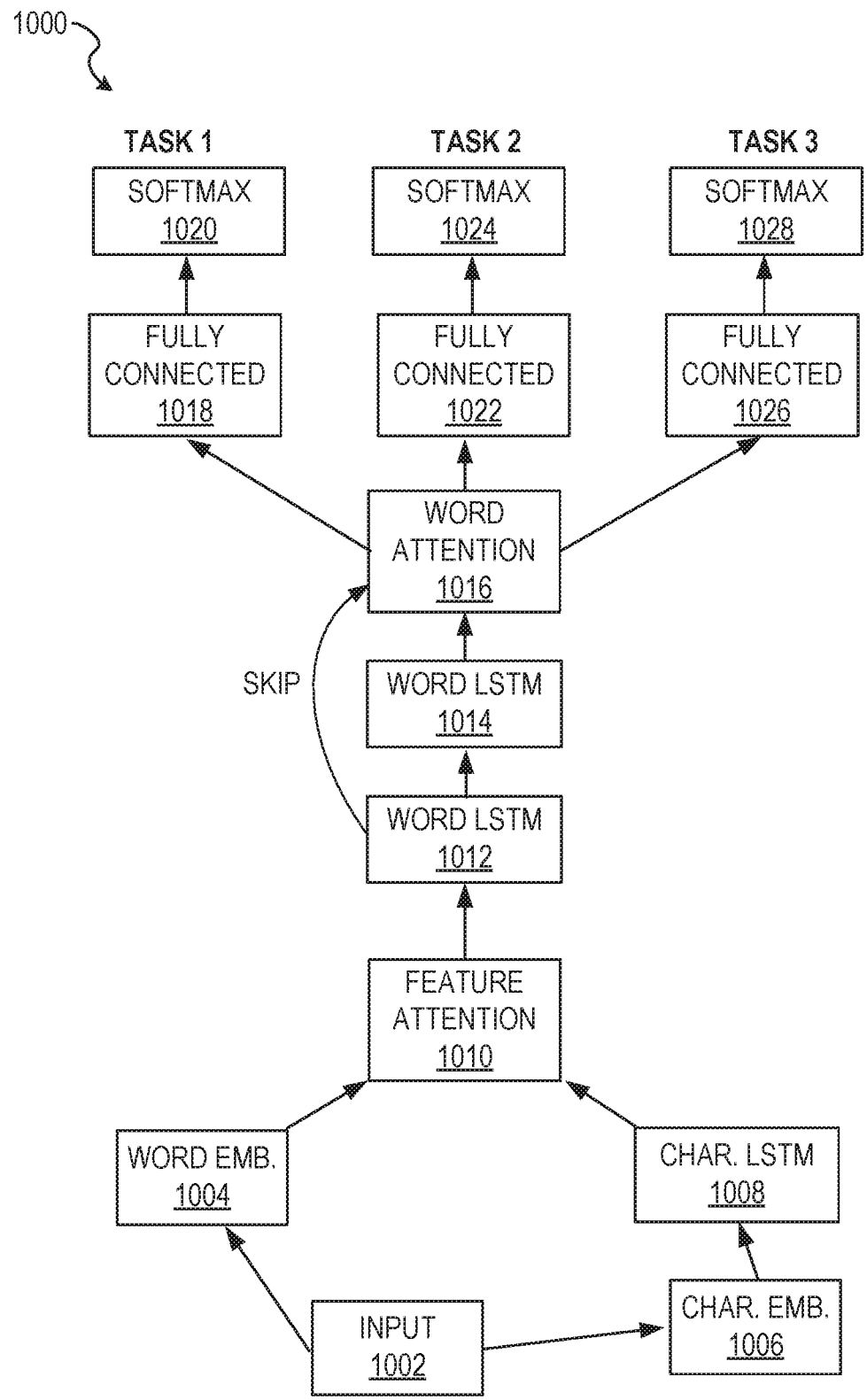
FIG. 10 shows an example architecture of the multi-task engine, according to some example embodiments.

FIG. 10 shows an example neural network architecture 1000 of the multi-task engine 720, according to some example embodiments. As illustrated, input data 1002 (e.g., a caption, text sentence, one or more characters of text) is used to generate character embedding data 1006 from each character (e.g., a letter, a punctuation mark, a number) in the input data, and further used to generate word embedding data 1004 from each word in the input data (e.g., each word in a caption or sentence accompanying an emoji). The character embedding data 1006 is input into a character level long short-term memory (LSTM) 1008. In some example embodiments, the LSTMs are bidirectional LSTMs, where a individual bidirectional LSTM consists of a forward LSTM that processes input data from left to right, and a backward LSTM that processes data from right to left. As a result, the output representation of a bidirectional LSTM is an encoding in both time directions of a given input message.

The word embedding data 1004 and the output of the character LSTM 1008 are fused together by the feature attention network 1010, according to some example embodiments. The feature attention network 1010 is configured to linearly use multiple input signals instead of simply concatenating them. In some example embodiments, the feature attention network 1010 is trained using a unified word representation space, i.e., feature attention network 1010 generates a single vector representation with aggregated knowledge among the multiple input word representations based on their weighted importance.

Sentence embeddings are computed using a stack of bidirectional LSTMs and a word attention layer. The word attention layer is configured to place emphasis or weight on words that are more important in a given sentence or caption. With reference to FIG. 10, the output of feature attention network 1010 is an input into a first word LSTM network 1012, which outputs into a second word LSTM network 1014. In some example embodiments, the architecture 1000 omits the feature attention network 1010 and the character embedding data 1006, and the output of the character LSTM 1008 is input directly into the first word LSTM network 1012. Further, the output of the first word LSTM network 1012 and the second word LSTM network 1014 is input into a word attention network 1016.

The output of the word attention network 1016 is input into classifier pairs, such as a fully connected network that outputs into a SoftMax layer. In particular, as illustrated in FIG. 10, word attention network 1016 outputs representation data into a plurality of fully connected networks, such as fully connected network 1018, fully connected network 1022, and fully connected network 1026. Each of the fully connected networks inputs into a respective SoftMax layer: fully connected network 1018 inputs into SoftMax layer 1020, fully connected network 1022 inputs into SoftMax layer 1024, and fully connected network 1026 inputs into SoftMax layer 1028.

Each classifier pair is trained for a different task. For example, the fully connected network 1018 and the SoftMax layer 1020 may be trained for a first task, such as single symbol prediction. Further, the fully connected network 1022 and its corresponding SoftMax layer 1024 may be trained for a second task, such as subcategory level symbol prediction. Further, the fully connected network 1026 and its corresponding SoftMax layer 1028 may be trained for a third task, such as category level symbol prediction. In some example embodiments, the quantity of tasks sets how many fully connected layers and classification layer pairs are included in architecture 1000. For example, to implement method 875 (FIG. 8C) in which only two tasks are used (e.g., a first single symbol prediction task, and a second semantically clustered category prediction task), only two sets of fully connected layers and classification layers are used (i.e., fully connected network 1026 and SoftMax layer 1028 would be removed from architecture 1000).

In some example embodiments, parameters are shared across the entire network architecture 1000, and specialization for different tasks only occurs at the final stage (e.g., in which the fully connected neural networks output to respective SoftMax layers) to predict specific labels for each different task. In some example embodiments the specialization is implemented using linear transformations and cross entropy loss function for all classification tasks. In some embodiments, the final loss of architecture 1000 is the sum of each single loss for each of the tasks.

Figure 11:
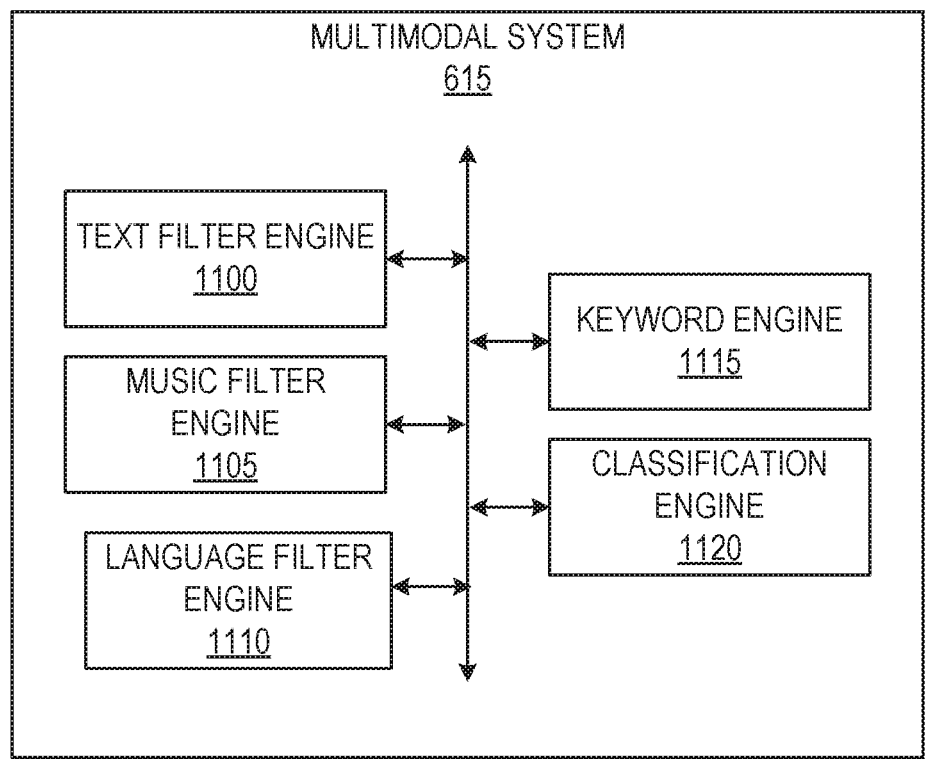
FIG. 11 shows example internal functional engines of a multimodal system, according to some example embodiments.

FIG. 11 shows example internal functional engines of a multimodal system 615, according to some example embodiments. As illustrated, the multimodal system 615 comprises a text filter engine 1100, a music filter engine 1105, a language filter engine 1110, a keyword engine 1115, and a classification engine 1120. To avoid obscuring the inventive subject matter with unnecessary detail, various functional components (e.g., modules and engines) that are not germane to conveying an understanding of the inventive subject matter have been omitted from FIG. 11. However, a skilled artisan will readily recognize that various additional functional components may be supported by the multimodal system 615 to facilitate additional functionality that is not specifically described herein.

As is understood by skilled artisans in the relevant computer arts, each functional component (e.g., module) illustrated in FIG. 11 may be implemented using hardware (e.g., a processor of a machine) or a combination of logic (e.g., executable software instructions) and hardware (e.g., memory and processor of a machine) for executing the logic. Furthermore, the various functional components depicted in FIG. 11 may reside on a single computer (e.g., a laptop), or may be distributed across several computers in various arrangements such as cloud-based architectures. Moreover, any two or more modules of the multimodal system 615 may be combined into a single module, or subdivided among multiple modules. It shall be appreciated that while the functional components (e.g., modules) of FIG. 11 are discussed in the singular sense, in other embodiments, multiple instances of one or more of the modules may be employed.

The text filter engine 1100 is configured to retrieve training data (e.g., publicly available social network posts) and filter out one or more of the retrieved items based on whether they have at least a prespecified quantity of pictorial symbols. The music filter engine 1105 is configured to detect items in the training data that have audio data featuring music (e.g., a video clip of a user with music playing in the background). The music filter engine 1105 is configured to remove or otherwise filter the detected items from the training data. The language filter engine 1110 is configured to remove or otherwise filter items in the training data that comprise words spoken in a language other than the primary language. In some example embodiments, the language filter engine 1110 identifies the primary language using the keyboard setting of the client device 102 of the user, or by implementing the machine learning scheme. The keyword engine 1115 is configured to implement a keyword recognition scheme to identify keywords in audio data in the received input data (e.g., an ephemeral message to be published). The classification engine 1120 is configured to receive input data and use a trained machine learning scheme (e.g., random forest) to generate a pictorial symbol suggestion.

Figure 12:
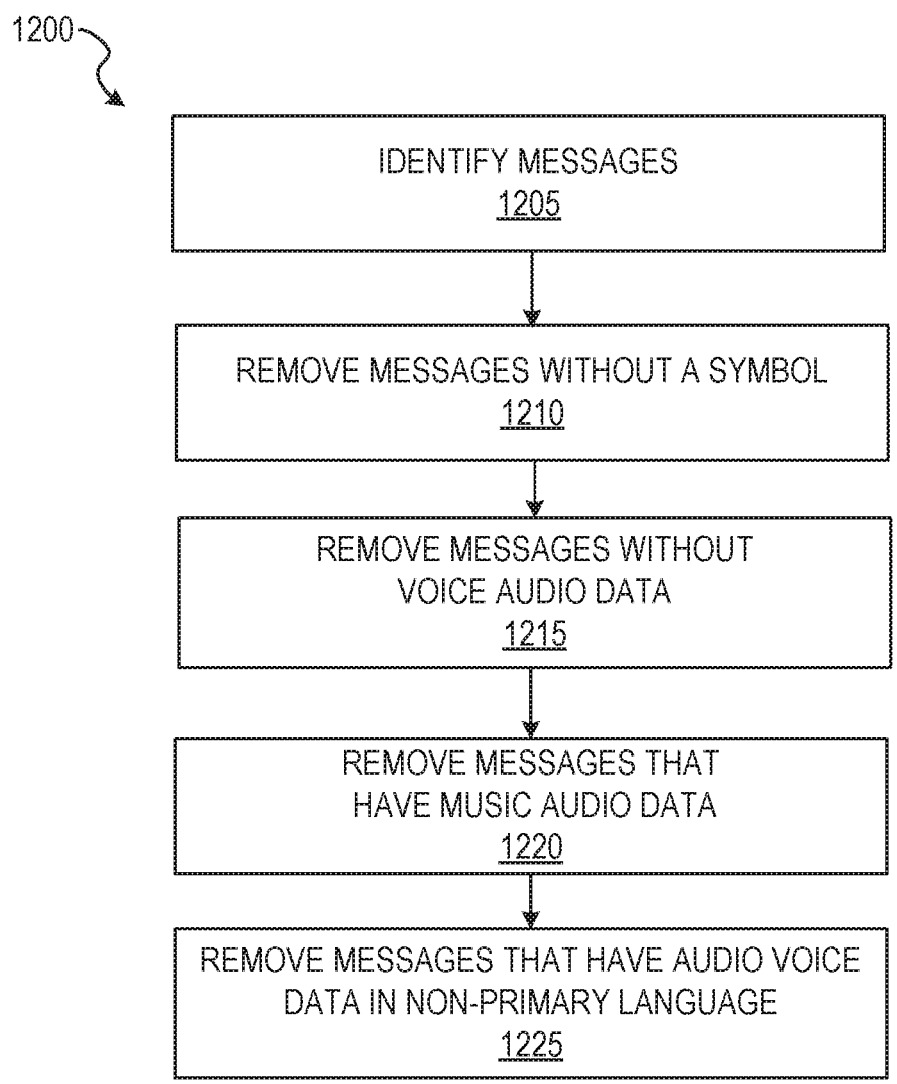
FIG. 12 shows a flow diagram of a method for implementing emoji suggestions from multimodal messages, according to some example embodiments.

FIG. 12 shows a flow diagram of a method 1200 for implementing emoji suggestions from multimodal messages, according to some example embodiments. At operation 1205, the text filter engine 1100 retrieves publicly available messages or posts (e.g., posts available over network 106 to the general public). The messages can include recently published multimodal messages having image or video, audio data, overlaid captions, emojis, and/or other visual overlaid elements.

At operation 1210, the text filter engine 1100 removes or otherwise filters messages that do not have at least one pictorial symbol (e.g., at least one emoji). At operation 1215, the pictorial symbol system 150 removes or otherwise filters messages that do not have voice audio data (e.g., images, video clips with no audio data). At operation 1220, the music filter engine 1105 removes messages that have music audio data. For example, some of the messages may be multimodal messages including video data and audio data with music playing in the background. The music data can degrade the keyword recognition process. The music filter engine 1105 is trained to detect music in snaps and then remove or otherwise filter out the messages that include music. The music filter engine 1105 is trained with SoundNet features and a Deep Neural Network (DNN) is implemented to model SoundNet features for a binary (e.g., 0/1) classification. In some embodiments, a dataset that contains manually labeled music/non-music information is used to train the DNN model. In some embodiments, the DNN model has four fully connected layers, with each layer comprising 512 hidden neurons. The music filter engine 1105 implements majority voting to consolidate the frame level results into utterance level. The music filter engine 1105 then picks layer of conv4 from SoundNet as the features to use.

At operation 1225, the language filter engine 1110 removes messages that have audio voice data in a non-primary language. The machine learning systems are typically configured or trained for a certain language for a given geographical area. In some example embodiments, a language that is most predominant in the geographic area is set as the primary language, and the language filter engine 1110 removes messages that have voice data in a non-primary language for that region or demographic to improve suggestions for users in that region or demographic.

In some embodiments, the primary language is identified by determining what the keyboard language setting is of the user's client device (e.g., of a client device executing the multimodal system 615). In some example embodiments, the language filter engine 1110 implements a language machine learning scheme (e.g., langId.py) that learns large numbers of overlapping words and character-based n-gram features.

Figure 13:
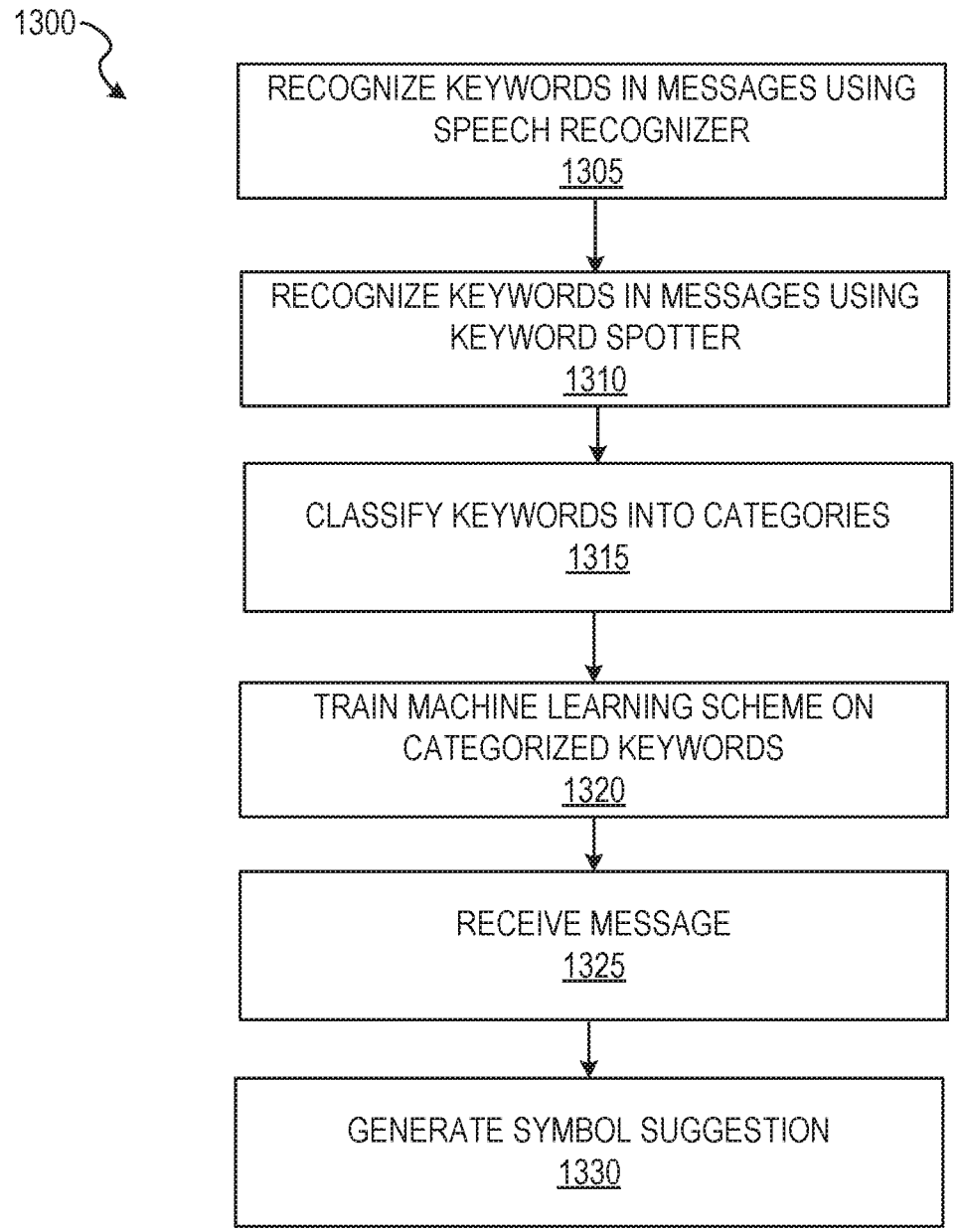
FIG. 13 shows a flow diagram of a method for multimodal suggestions, according to some example embodiments.

FIG. 13 shows a flow diagram of a method 1300 for multimodal suggestions, according to some example embodiments. The method 1300 may be implemented by the multimodal system 615 after the method 1200. At operation 1305, the keyword engine 1115 implements a speech recognizer to identify keywords in the retrieved messages. For example, at operation 1305, the keyword engine 1115 uses an Automatic Speech Recognition system using a modified Kaldi system, with forty-dimension Mel filter bank features, and a chain model for acoustic modeling. The training acoustic data includes publicly available datasets and some proprietary datasets. The proprietary datasets consist of short audio recordings with various types of background noise. The speech in the dataset is mainly spontaneous speech in casual talking style. The language model is interpolated from a general language model and a language model trained on the proprietary dataset.

At operation 1310, the keyword engine 1115 implements a keyword spotter to identify additional keywords in the messages. For example, at operation 1310, the keyword engine 1115 implements a neural network configured to recognize specific keywords. In some embodiments, the keywords used to train the neural network are spoken words in the publicly available multimodal messages. In some embodiments, the keywords used to train the neural network are from a pre-set list. An example pre-set list of keywords includes: America, american, announcement, ball, black, breakfast, celebration, climax, cold, congratulations, cool, crazy, cry, crying, death, delicious, desire, dessert, donut, doughnut, eat, emotion, evil, exam, exhausted, finals, fire, flame, flirt, food, football, freezing, fried, frustrated, glasses, goofy, gridiron, grin, grinning, happy, heart, hearts, homer, hot, hundred, hungry, hurt, intense, joint, joy, kidding, kiss, kissing, laughing, lips, love, loyalty, marijuana, melancholy, morn, ok, okay, party, passion, pastry, percent, perfect, pink, playful, plus, police, popper, pot, quiz, romance, sad, savoring, savory, school, score, silly, sleepy, smile, smoke, smooth, sob, sobbing, somber, sport, stability, study, sun, sunglasses, sunny, superbowl, sweet, tada, tasty, tears, test, tired, tiredness, tongue, trust, truth, victory, weary, wink, winking, and yummy.

At operation 1315, the classification engine 1120 classifies the keywords into categories. In some example embodiments, the classification engine 1120 implements a bag-of-words (BOW) classifier to classify keywords into categories at operation 1315. The bag-of-words classifier represents text as a vector that includes such features as term frequency inverse document frequency (TF-IDF). The BOW model feature set can be expanded with bigrams and trigrams.

At operation 1320, the classification engine 1120 trains a machine learning model on the keywords that have been classified into categories. In some example embodiments, the classification engine 1120 trains a random forest model with 100 trees (sklearn implementation) on the keyword categories.

At operation 1325, the classification engine 1120 receives input data, such as a multimodal message (e.g., an ephemeral message of a user exclaiming into the camera "wow!" or "mind blown!"). In response to receiving the message, the classification engine 1120 may automatically implement the trained machine learning scheme, such as random forest, to analyze the voice audio data (e.g., "wow") to generate an emoji suggestion (e.g., emoji 1736 "mushroom cloud") at operation 1330.

Figure 14:
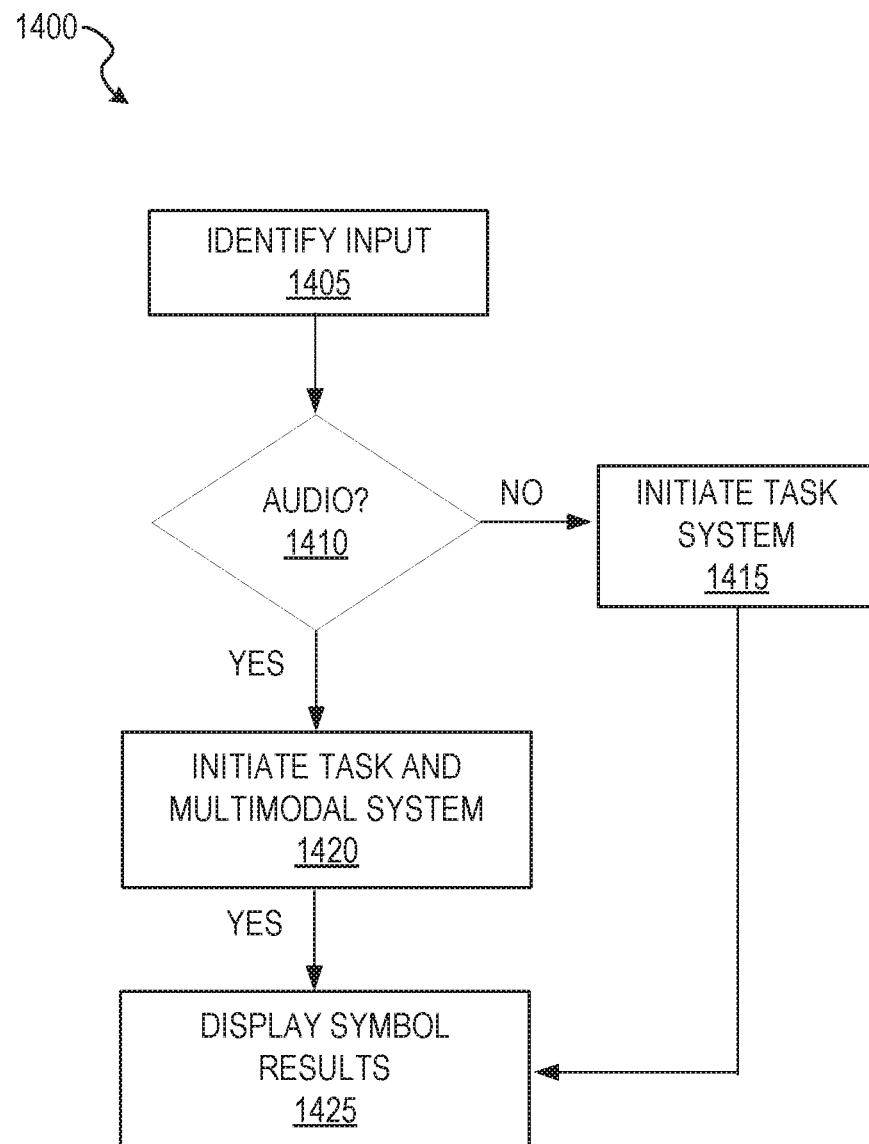
FIG. 14 shows an example flow diagram of a method for displaying symbol results, according to some example embodiments.

FIG. 14 shows an example flow diagram of a method 1400 for displaying symbol results, according to some example embodiments. At operation 1405, the content engine 620 identifies input data. For example, at operation 1405, the content engine 620 identifies a message to be published to a network site. At operation 1410, the content engine 620 determines whether the input data contains audio data (e.g., a video clip with audio data). If the input data does not contain audio data, then the content engine 620 initiates the task system 610 to generate multi-task based symbol suggestions at operation 1415. The results generated by the task system 610 are then displayed by the content engine 620 as suggestions to the user at operation 1425. On the other hand, if the input data does contain audio data, then the content engine 620 initiates the task system 610 and the multimodal system 615 at operation 1420 to generate symbol suggestions. At operation 1425 the symbol or content suggestions generated by the different systems are displayed to the user as suggestions in different areas of a user interface, as discussed below with reference to FIG. 16.

Figure 15:
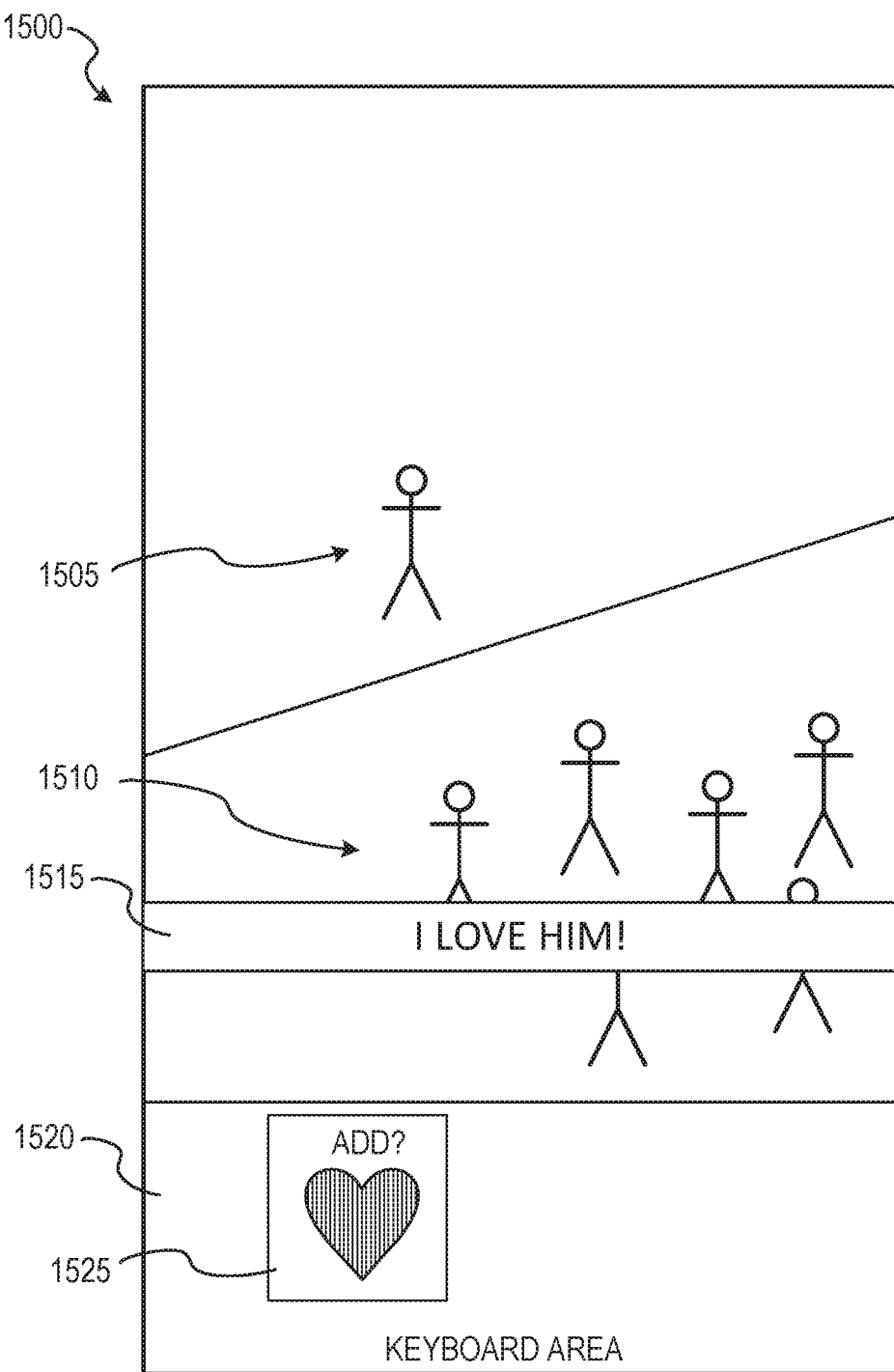
FIG. 15 shows an example user interface for pictorial symbol prediction, according to some example embodiments.

FIG. 15 shows an example user interface 1500 for pictorial symbol prediction, according to some example embodiments. In the example of FIG. 15, the user interface 1500 displays a client-device-captured image depicting a singer 1505 on a stage that is singing to an audience 1510. The user of the client device has further input a caption 1515 using an on-screen keyboard (not depicted). In some example embodiments the caption 1515 is input into the pictorial symbol system 150, which outputs suggested content, such as a heart sticker image 1525, in a keyboard area 1520 of the user interface 1500. The user then may select the heart sticker image 1525 to be included in the caption 1515 or as overlay content anywhere in the image.

Figure 16:
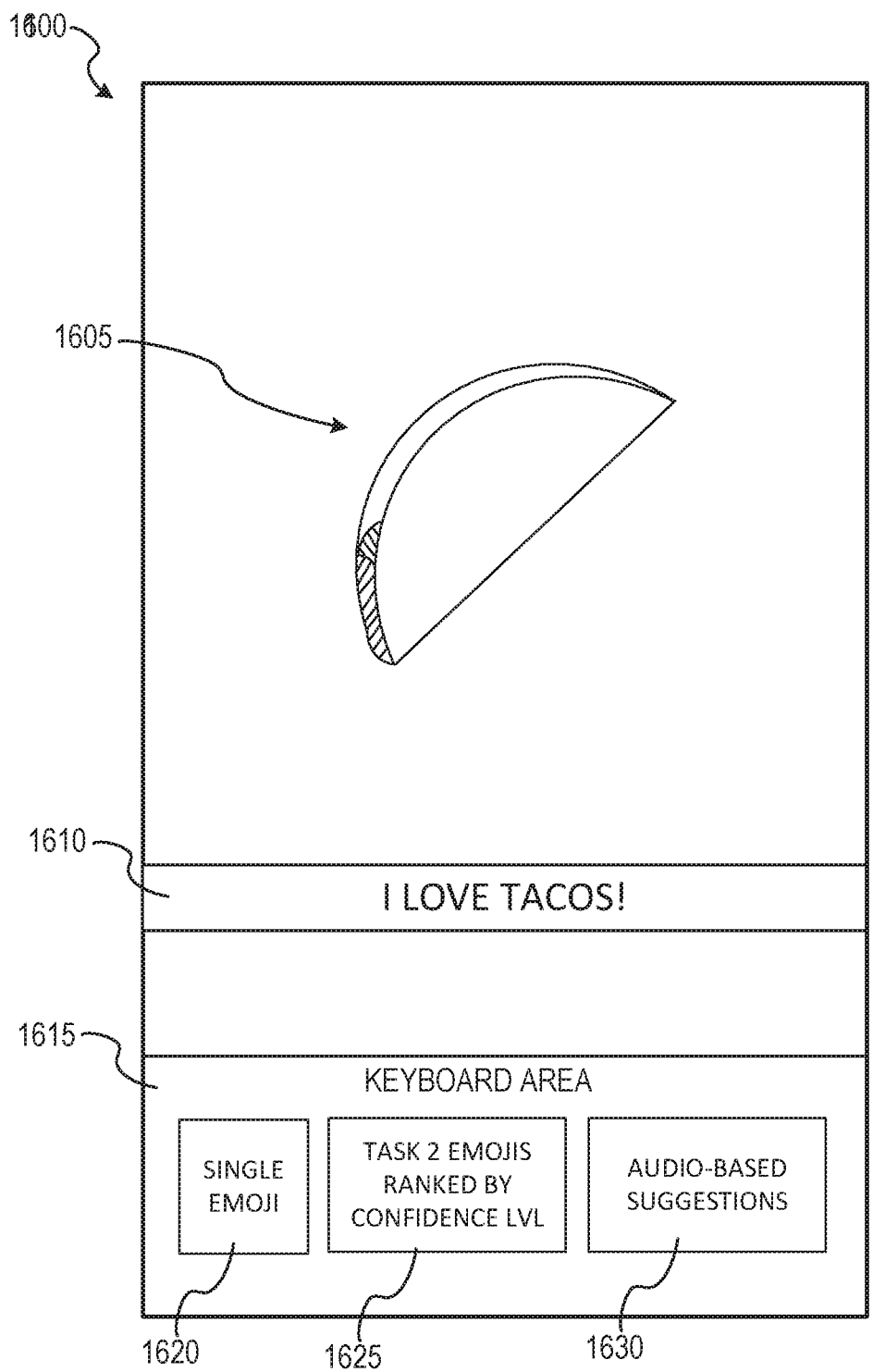
FIG. 16 shows an example user interface for pictorial symbol prediction, according to some example embodiments.

FIG. 16 shows an example user interface 1600 for pictorial symbol prediction, according to some example embodiments. In the example of FIG. 16, the user interface 1600 displays a client-device-captured image depicting a taco 1605. A user of the client device has further input a caption 1610 using an on-screen keyboard (not depicted). The caption 1610 is input into the pictorial symbol system 150, which outputs suggested content in a keyboard area 1615. For example, a first window 1620 can display an individual symbol generated by the task system 610, a second window 1625 can display subcategories or categories of symbols that are generated by the task system 610, and further a third window 1630 can display symbols from the multimodal system 615.

FIG. 17 shows an example set of pictorial symbols 1700, according to some example embodiments. The pictorial symbols 1700 included are emojis 1702-1740, each of which belongs to a Unicode category and subcategory.

Figure 18:
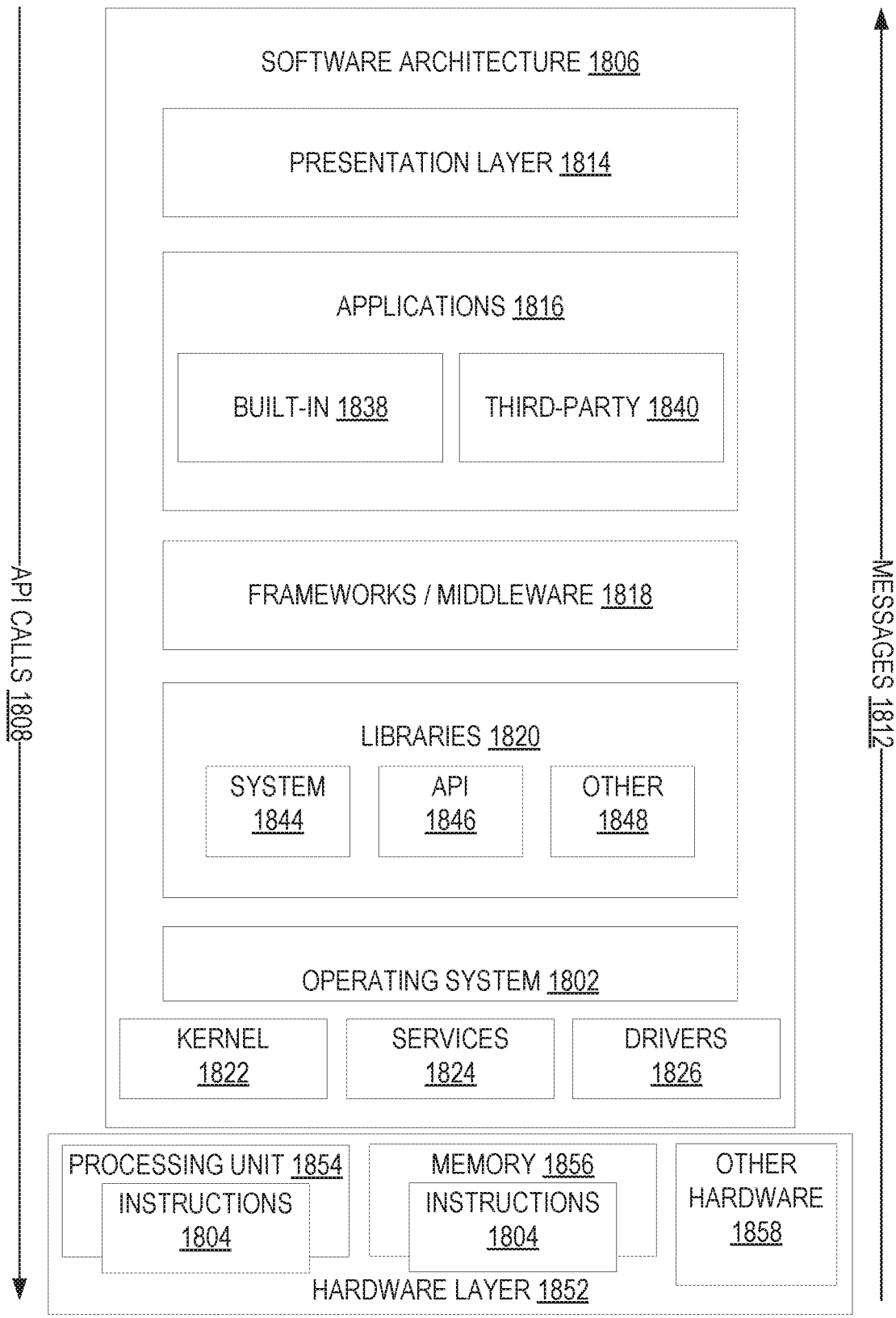
FIG. 18 is a block diagram illustrating a representative software architecture, which may be used in conjunction with various hardware architectures herein described.

FIG. 18 is a block diagram illustrating an example software architecture 1806, which may be used in conjunction with various hardware architectures herein described. FIG. 18 is a non-limiting example of a software architecture, and it will be appreciated that many other architectures may be implemented to facilitate the functionality described herein. The software architecture 1806 may execute on hardware such as a machine 1900 of FIG. 19 that includes, among other things, processors 1910, memory 1932, and I/O components 1950. A representative hardware layer 1852 is illustrated and can represent, for example, the machine 1900 of FIG. 19. The representative hardware layer 1852 includes a processing unit 1854 having associated executable instructions 1804. The executable instructions 1804 represent the executable instructions of the software architecture 1806, including implementation of the methods, components, and so forth described herein. The hardware layer 1852 also includes memory and/or storage modules 1856, which also have the executable instructions 1804. The hardware layer 1852 may also comprise other hardware 1858.

In the example architecture of FIG. 18, the software architecture 1806 may be conceptualized as a stack of layers where each layer provides particular functionality. For example, the software architecture 1806 may include layers such as an operating system 1802, libraries 1820, frameworks/middleware 1818, applications 1816, and a presentation layer 1814. Operationally, the applications 1816 and/or other components within the layers may invoke application programming interface (API) calls 1808 through the software stack and receive a response in the form of messages 1812. The layers illustrated are representative in nature and not all software architectures have all layers. For example, some mobile or special-purpose operating systems may not provide a frameworks/middleware 1818, while others may provide such a layer. Other software architectures may include additional or different layers.

The operating system 1802 may manage hardware resources and provide common services. The operating system 1802 may include, for example, a kernel 1822, services 1824, and drivers 1826. The kernel 1822 may act as an abstraction layer between the hardware and the other software layers. For example, the kernel 1822 may be responsible for memory management, processor management (e.g., scheduling), component management, networking, security settings, and so on. The services 1824 may provide other common services for the other software layers. The drivers 1826 are responsible for controlling or interfacing with the underlying hardware. For instance, the drivers 1826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1820 provide a common infrastructure that is used by the applications 1816 and/or other components and/or layers. The libraries 1820 provide functionality that allows other software components to perform tasks in an easier fashion than by interfacing directly with the underlying operating system 1802 functionality (e.g., kernel 1822, services 1824, and/or drivers 1826). The libraries 1820 may include system libraries 1844 (e.g., C standard library) that may provide functions such as memory allocation functions, string manipulation functions, mathematical functions, and the like. In addition, the libraries 1820 may include API libraries 1846 such as media libraries (e.g., libraries to support presentation and manipulation of various media formats such as MPEG4, H.264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1820 may also include a wide variety of other libraries 1848 to provide many other APIs to the applications 1816 and other software components/modules.

The frameworks/middleware 1818 provide a higher-level common infrastructure that may be used by the applications 1816 and/or other software components/modules. For example, the frameworks/middleware 1818 may provide various graphic user interface (GUI) functions, high-level resource management, high-level location services, and so forth. The frameworks/middleware 1818 may provide a broad spectrum of other APIs that may be utilized by the applications 1816 and/or other software components/modules, some of which may be specific to a particular operating system 1802 or platform.

The applications 1816 include built-in applications 1838 and/or third-party applications 1840. Examples of representative built-in applications 1838 may include, but are not limited to, a contacts application, a browser application, a book reader application, a location application, a media application, a messaging application, and/or a game application. The third-party applications 1840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1840 may invoke the API calls 1808 provided by the mobile operating system (such as the operating system 1802) to facilitate functionality described herein.

The applications 1816 may use built-in operating system functions (e.g., kernel 1822, services 1824, and/or drivers 1826), libraries 1820, and frameworks/middleware 1818 to create user interfaces to interact with users of the system. Alternatively, or additionally, in some systems interactions with a user may occur through a presentation layer, such as the presentation layer 1814. In these systems, the application/component "logic" can be separated from the aspects of the application/component that interact with a user.

Figure 19:
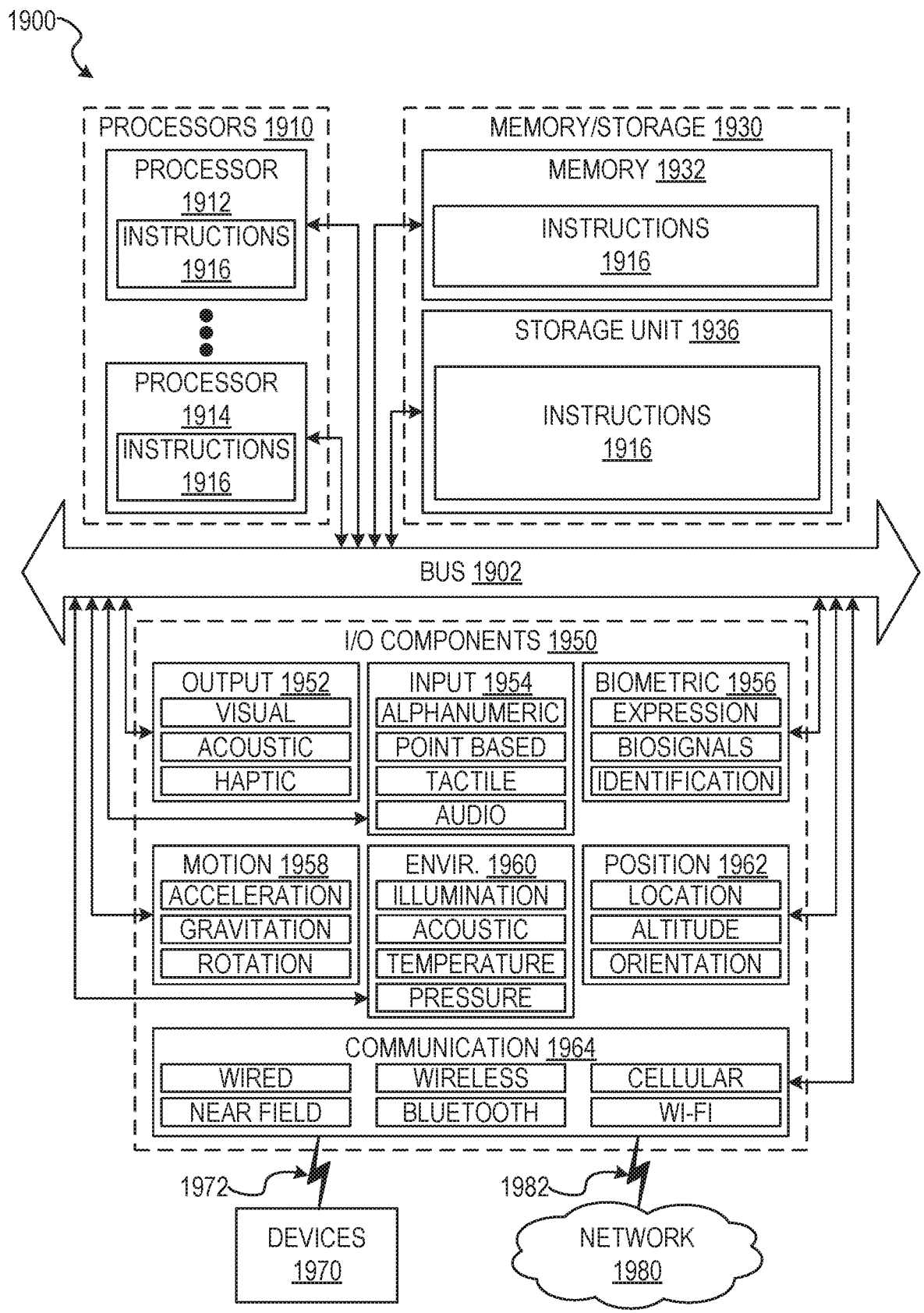
FIG. 19 is a block diagram illustrating components of a machine, according to some example embodiments, able to read instructions from a machine-readable medium (e.g., a machine-readable storage medium) and perform any one or more of the methodologies discussed herein.

FIG. 19 is a block diagram illustrating components of a machine 1900, according to some example embodiments, able to read instructions from a machine-readable medium (e.g., a machine-readable storage medium) and perform any one or more of the methodologies discussed herein. Specifically, FIG. 19 shows a diagrammatic representation of the machine 1900 in the example form of a computer system, within which instructions 1916 (e.g., software, a program, an application, an applet, an app, or other executable code) for causing the machine 1900 to perform any one or more of the methodologies discussed herein may be executed. As such, the instructions 1916 may be used to implement modules or components described herein. The instructions 1916 transform the general, non-programmed machine 1900 into a particular machine 1900 programmed to carry out the described and illustrated functions in the manner described. In alternative embodiments, the machine 1900 operates as a standalone device or may be coupled (e.g., networked) to other machines. In a networked deployment, the machine 1900 may operate in the capacity of a server machine or a client machine in a server-client network environment, or as a peer machine in a peer-to-peer (or distributed) network environment. The machine 1900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1916, sequentially or otherwise, that specify actions to be taken by the machine 1900. Further, while only a single machine 1900 is illustrated, the term "machine" shall also be taken to include a collection of machines that individually or jointly execute the instructions 1916 to perform any one or more of the methodologies discussed herein.

The machine 1900 may include processors 1910 having individual processors 1912 and 1914 (e.g., cores), memory/storage 1930, and I/O components 1950, which may be configured to communicate with each other such as via a bus 1902. The memory/storage 1930 may include a memory 1932, such as a main memory, or other memory storage, and a storage unit 1936, both accessible to the processors 1910 such as via the bus 1902. The storage unit 1936 and memory 1932 store the instructions 1916 embodying any one or more of the methodologies or functions described herein. The instructions 1916 may also reside, completely or partially, within the memory 1932, within the storage unit 1936, within at least one of the processors 1910 (e.g., within the processor's cache memory), or any suitable combination thereof, during execution thereof by the machine 1900. Accordingly, the memory 1932, the storage unit 1936, and the memory of the processors 1910 are examples of machine-readable media.

The I/O components 1950 may include a wide variety of components to receive input, provide output, produce output, transmit information, exchange information, capture measurements, and so on. The specific I/O components 1950 that are included in a particular machine 1900 will depend on the type of machine. For example, portable machines such as mobile phones will likely include a touch input device or other such input mechanisms, while a headless server machine will likely not include such a touch input device. It will be appreciated that the I/O components 1950 may include many other components that are not shown in FIG. 19. The I/O components 1950 are grouped according to functionality merely for simplifying the following discussion and the grouping is in no way limiting. In various example embodiments, the I/O components 1950 may include output components 1952 and input components 1954. The output components 1952 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1954 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1950 may include biometric components 1956, motion components 1958, environment components 1960, or position components 1962 among a wide array of other components. For example, the biometric components 1956 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1958 may include acceleration sensor components (e.g., accelerometer), gravitation sensor components, rotation sensor components (e.g., gyroscope), and so forth. The environment components 1960 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1962 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1950 may include communication components 1964 operable to couple the machine 1900 to a network 1980 or devices 1970 via a coupling 1982 and a coupling 1972, respectively. For example, the communication components 1964 may include a network interface component or other suitable device to interface with the network 1980. In further examples, the communication components 1964 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1970 may be another machine or any of a wide variety of peripheral devices (e.g., a peripheral device coupled via a Universal Serial Bus (USB)).

Moreover, the communication components 1964 may detect identifiers or include components operable to detect identifiers. For example, the communication components 1964 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF419, Ultra Code, UCC RSS-2D barcode, and other optical codes), or acoustic detection components (e.g., microphones to identify tagged audio signals). In addition, a variety of information may be derived via the communication components 1964, such as location via Internet Protocol (IP) geolocation, location via Wi-Fi® signal triangulation, location via detecting an NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible media to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message is transitory.

"MACHINE-READABLE MEDIUM" in this context refers to a component, a device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner.

In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components.

Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
identifying one or more text characters input into a client device;
generating a plurality of pictorial symbol classifications from the one or more text characters, the plurality of pictorial symbol classifications including a pictorial symbol category classification for a group of pictorial symbols of a similar type and an individual pictorial symbol classification;
determining that one of the plurality of pictorial symbol classifications satisfies a specified threshold;
displaying, on a display device of the client device, a presentation of a single display element based on the individual pictorial symbol classification exceeding a specified individual pictorial symbol classification threshold; and
displaying, on the display device of the client device, a presentation of two or more display elements that are associated with the pictorial symbol category classification based on the pictorial symbol category classification exceeding a specified a pictorial symbol category classification threshold, the pictorial symbol category classification threshold being less than the specified individual pictorial symbol classification threshold.

2. The method of claim 1, wherein the generating is accomplished using a machine learning scheme that is a multitask neural network having a first network portion configured to generate individual pictorial symbol classifications and a second network portion configured to generate pictorial symbol category classifications.

3. The method of claim 2, wherein the machine learning scheme is trained using messages or posts that have a caption and at least one pictorial symbol.

4. The method of claim 2, wherein the multitask neural network further comprises a third network portion configured to generate pictorial symbol subcategory classifications.

5. The method of claim 2, wherein the machine learning scheme generates the plurality of pictorial symbol classifications in parallel.

6. The method of claim 2, further comprising:
generating categories of the pictorial symbol classifications using an additional machine learning scheme configured to cluster similar types of pictorial symbols.

7. The method of claim 6, wherein the additional machine learning scheme implements k-means clustering to group similar types of pictorial symbols.

8. The method of claim 7, wherein the additional machine learning scheme is trained using a plurality of network published posts, each of the plurality of network published posts comprising one or more text characters and a pictorial symbol.

9. The method of claim 1, wherein the one or more text characters are input into the client device by:
receiving voice data at the client device; and
performing speech recognition on the voice data to identify words in the voice data.

10. The method of claim 1 wherein the presentation of two or more display elements comprises a first window for displaying an individual symbol and a second window for displaying at least one symbol in a subcategory or category of symbols.

11. The method of claim 1, wherein the display elements include one or more of: an emoji, an emoticon, or an image.

12. A system comprising:
one or more processors of a machine; and
a memory storing instructions that, when executed by at least one processor among the one or more processors, causes the machine to perform operations comprising:
identifying one or more text characters input into a client device;
generating a plurality of pictorial symbol classifications from the one or more text characters, the plurality of pictorial symbol classifications including a pictorial symbol category classification for a group of pictorial symbols of a similar type and an individual pictorial symbol classification;

determining that one of the plurality of pictorial symbol classifications satisfies a specified threshold;

displaying, on a display device of the client device, a presentation of a single display element based on the individual pictorial symbol classification exceeding a specified individual pictorial symbol classification threshold; and displaying, on the display device of the client device, a presentation of two or more display elements that are associated with the pictorial symbol category classification based on the pictorial symbol category classification exceeding a specified a pictorial symbol category classification threshold, the pictorial symbol category classification threshold being less than the specified individual pictorial symbol classification threshold.

13. The system of claim 12, wherein the generating is accomplished using a machine learning scheme that is a multitask neural network having a first network portion configured to generate individual pictorial symbol classifications and a second network portion configured to generate pictorial symbol category classifications.

14. The method of claim 13, wherein the machine learning scheme generates the plurality of pictorial symbol classifications in parallel.

15. The system of claim 12 wherein the one or more text characters are input into the client device by:
receiving voice data at the client device; and
performing speech recognition on the voice data to identify words in the voice data.

16. The system of claim 12 wherein the presentation of two or more display elements comprises a first window for displaying an individual symbol and a second window for displaying at least one symbol in a subcategory or category of symbols.

17. A machine-readable storage device embodying instructions that, when executed by a device, cause the device to perform operations comprising:
identifying one or more text characters input into a client device;

generating a plurality of pictorial symbol classifications from the one or more text characters, the plurality of pictorial symbol classifications including a pictorial symbol category classification for a group of pictorial symbols of a similar type and an individual pictorial symbol classification;

determining that one of the plurality of pictorial symbol classifications satisfies a specified threshold;

displaying, on a display device of the client device, a presentation of a single display element based on the individual pictorial symbol classification exceeding a specified individual pictorial symbol classification threshold; and displaying, on the display device of the client device, a presentation of two or more display elements that are associated with the pictorial symbol category classification based on the pictorial symbol category classification exceeding a specified a pictorial symbol category classification threshold, the pictorial symbol category classification threshold being less than the specified individual pictorial symbol classification threshold.

18. The machine-readable storage device of claim 17, wherein the generating is accomplished using a machine learning scheme that is a multitask neural network having a first network portion configured to generate individual pictorial symbol classifications and a second network portion configured to generate pictorial symbol category classifications.

19. The machine-readable storage device of claim 17, wherein the one or more text characters are input into the client device by:
receiving voice data at the client device; and
performing speech recognition on the voice data to identify words in the voice data.

20. The machine-readable storage device of claim 17, wherein the presentation of two or more display elements comprises a first window for displaying an individual symbol and a second window for displaying at least one symbol in a subcategory or category of symbols.

* * * * *